(12) United States Patent
Mahecha-Botero et al.

(10) Patent No.: US 10,933,368 B2
(45) Date of Patent: Mar. 2, 2021

(54) GAS TREATMENT PROCESSES AND SYSTEMS FOR REDUCING TAIL GAS EMISSIONS

(71) Applicant: NORAM Engineering and Constructors Ltd., Vancouver (CA)

(72) Inventors: Andrés Mahecha-Botero, Vancouver (CA); Kim Martin Nikolaisen, West Vancouver (CA); Bradley Wayne Morrison, Maple Ridge (CA); C. Guy Cooper, Vancouver (CA); Brian Ferris, Vancouver (CA)

(73) Assignee: NORAM Engineering and Constructors Ltd., Vancouver (CA)

( * ) Notice: Subject to any disclaimer, the term of this patent is extended or adjusted under 35 U.S.C. 154(b) by 175 days.

(21) Appl. No.: 16/132,228

(22) Filed: Sep. 14, 2018

(65) Prior Publication Data
US 2019/0076776 A1 Mar. 14, 2019

Related U.S. Application Data

(60) Provisional application No. 62/558,730, filed on Sep. 14, 2017.

(51) Int. Cl.
*B01D 53/14* (2006.01)
*F01N 9/00* (2006.01)
(Continued)

(52) U.S. Cl.
CPC ......... *B01D 53/1481* (2013.01); *B01D 53/50* (2013.01); *F01N 3/085* (2013.01);
(Continued)

(58) Field of Classification Search
None
See application file for complete search history.

(56) References Cited

U.S. PATENT DOCUMENTS

| 4,281,821 A | * | 8/1981 | Kawazoe | C01B 17/765 266/144 |
| 5,194,239 A | * | 3/1993 | Masseling | C01B 17/74 423/522 |

(Continued)

OTHER PUBLICATIONS

Louie, D.K., Handbook of sulphuric acid manufacturing, 2nd ed. pp. 18-60 to 18-61, 1961.

*Primary Examiner* — Sheng H Davis
(74) *Attorney, Agent, or Firm* — Oyen Wiggs Green & Mutala LLP

(57) ABSTRACT

Gas treatment systems and processes for reducing tail gas emissions such as $SO_2$, $SO_3$, $H_2SO_4$, NOx, HC, CO, and other pollutants are provided. The processes include transferring tail gas from at least one source of tail gas to at least one destination sulphuric acid plant via a tail gas transfer system, wherein the tail gas replaces or supplements one or more of the combustion gas, air feed, dilution gas, and quench gas used by the destination sulphuric acid plant. The systems include at least one destination sulphuric acid plant and a tail gas transfer system for transferring tail gas from at least one source of tail gas to the at least one destination sulphuric acid plant. The systems and processes described herein may be used to eliminate start-up emissions and/or convert sulphur-containing species present in tail gas emissions into commercial $H_2SO_4$.

33 Claims, 4 Drawing Sheets

(51) Int. Cl.
*F01N 3/08* (2006.01)
*B01D 53/50* (2006.01)
*F01N 3/10* (2006.01)
*B01J 8/02* (2006.01)

(52) U.S. Cl.
CPC ............. *F01N 3/10* (2013.01); *F01N 9/00* (2013.01); *B01D 2252/204* (2013.01); *B01D 2253/108* (2013.01); *B01D 2257/302* (2013.01); *B01J 8/02* (2013.01); *B01J 2219/0004* (2013.01); *B01J 2219/00033* (2013.01); *B01J 2219/00051* (2013.01); *B01J 2219/00164* (2013.01); *F01N 2560/025* (2013.01); *F01N 2560/027* (2013.01); *F01N 2570/04* (2013.01); *F01N 2900/1402* (2013.01); *F01N 2900/1404* (2013.01)

(56) References Cited

U.S. PATENT DOCUMENTS

| | | |
|---|---|---|
| 8,521,333 B2 | 8/2013 | Richman et al. |
| 2004/0219910 A1 | 11/2004 | Beckers |
| 2013/0319225 A1* | 12/2013 | Ravikumar ........ B01D 53/1412 95/1 |
| 2014/0219910 A1 | 8/2014 | Lykke |

* cited by examiner

GAS TREATMENT PROCESSES AND SYSTEMS FOR REDUCING TAIL GAS EMISSIONS

CROSS-REFERENCE TO RELATED APPLICATION

This application claims the benefit under 35 U.S.C. § 119 of U.S. Application No. 62/558,730 filed 14 Sep. 2017 entitled GAS TREATMENT PROCESSES AND SYSTEMS FOR REDUCING TAIL GAS EMISSIONS which is hereby incorporated herein by reference for all purposes.

TECHNICAL FIELD

The present invention relates to gas treatment processes (GTPs) and systems for reducing tail gas emissions such as sulphur dioxide ($SO_2$), sulphur trioxide ($SO_3$), sulphuric acid ($H_2SO_4$), nitrogen oxides ($NO_x$), hydrocarbons (HC), carbon monoxide (CO), and other pollutants during plant start-up and upset conditions.

BACKGROUND

Removal of $SO_2$, $SO_3$, $H_2SO_4$, $NO_x$, HC, CO, and other pollutants from tail gas is critical to meeting increasingly tight environmental regulations in many industries.

Environmental regulations can be plant or site specific. It can be difficult to provide comprehensive solutions that can address the emissions from one or more sources in an industrial facility especially when the total emission levels from individual sources change significantly over an operation cycle.

While essentially all industrial operations have some kind of emission limitations during continuous operation, the regulations regarding emissions during plant start-up vary widely. Start-up emissions are gaining more attention from regulatory authorities, plant owners, and the general public. Controlling start-up emissions will be increasingly important especially for processes that produce large amounts of pollution during start-up and upset conditions.

A number of methods with different levels of maturity exist to meet existing environmental regulations regarding emissions of $SO_2$, $SO_3$, $H_2SO_4$, $NO_x$, HC, CO and other pollutants. Some methods require small changes to the plant operation and equipment. These can be useful to improve the emission levels of a plant, but alone they tend to offer only incremental reductions in emissions. These methods include:

Modifications of Procedures for Plant Operation, Start-Up and Shut-Down: Plant start-up procedures can be modified to reduce the total emissions from the plant gas stack. Example modifications include optimization of preheating sequences, modification of process set-points, operation with lower gas strengths, simultaneous preheating of key unit operations, preheating of absorption circuits, and plant gas purging strategies.

Equipment Modifications: Plant equipment can be modified to achieve lower emissions. For example, more active catalysts can be used to minimize emissions in the plant gas stack and/or improved preheaters can be used to more quickly achieve ideal process temperatures. Some embodiments of the present invention do not require the modification of existing equipment.

Use of Different Feedstock: Processes involving combustion of fuels may choose to use low-sulphur content fuels. Such fuels are typically more expensive than high-sulphur content fuels. Some embodiments of the present invention do not require changing the feedstock.

Other methods implement tail gas cleaning technologies. Examples of such technologies include:

Chemical Scrubbing Technologies: These technologies remove sulphur species by contacting process gas with a chemical in a scrubber. Such chemicals include liquid caustic solutions or calcium hydroxide granules to remove sulphur species. These technologies typically produce a liquid or solid waste stream. Dry and wet scrubbers are well-known examples of chemical scrubbing. Depending on applications, dry and wet scrubbers may operate over a broad temperature range. Some embodiments of the present invention fundamentally differ from chemical scrubbing technologies because they do not require any additional chemical feeds, and do not produce any by-products or waste.

Absorption/Desorption Technologies: These technologies remove sulphur species using absorption/desorption columns. These technologies typically use chemical absorbents (e.g. amines), physical absorbents, or adsorbents (e.g. zeolites or activated carbon). $SO_2$ is separated from the tail gas. These technologies require large capital investments in tall absorption/desorption columns and consume significant amounts of energy to regenerate the absorber.

Mist Removal Technologies: These technologies remove acid mist using electrostatic precipitation, fiber-bed filters, or high-intensity direct contact scrubbers. Mist removal technologies are only effective in removing acid mist and have limited capability to remove other pollutants.

Other technologies use gas transfer. Examples of these technologies include: power plant gas recirculation (e.g. U.S. Pat. No. 8,521,333); and internal gas recirculation in wet plants (e.g. US Publication No. 2014/0219910). Power plant gas recirculation does not address emissions of sulphur-containing species. Internal gas recirculation does not address the issues of emissions, start-up conditions, or the use of multiple plants.

There is a general desire to reduce emissions of one or more of $SO_2$, $SO_3$, $H_2SO_4$, $NO_x$, HC, CO, and other pollutants from tail gas during plant start-up and/or upset conditions.

The foregoing examples of the related art and limitations related thereto are intended to be illustrative and not exclusive. Other limitations of the related art will become apparent to those of skill in the art upon a reading of the specification and a study of the drawings.

SUMMARY

The present invention relates to gas treatment processes (GTPs) and systems for removing sulphur-containing species from tail gas during plant start-up and/or upset conditions. Some embodiments provide processes which reduce or eliminate one or more of $SO_2$, $SO_3$, and $H_2SO_4$ from the tail gas. Some embodiments may also be used to reduce or eliminate one or more of NOx, HC, CO, and other pollutants from the tail gas.

One or more of $SO_2$, $SO_3$, $H_2SO_4$, $NO_x$, HC, CO, and other pollutants may be removed from tail gas by supplying the tail gas with one or more of combustion gas, air feed, dilution gas, and quench gas to a sulphuric acid plant. Some embodiments of the present invention convert sulphur-containing species in tail gas into product $H_2SO_4$.

The present invention has a number of aspects. One aspect of the present invention provides a GTP for reducing emissions of one or more of $SO_2$, $SO_3$, $H_2SO_4$, $NO_x$, HC, CO, and other pollutants from a tail gas. The process includes transferring the tail gas from a source sulphuric acid plant operating in start-up or upset conditions to a destination sulphuric acid plant operating in steady state conditions via a gas transfer system.

In some embodiments the process further includes monitoring a concentration of one or more of $SO_2$, $SO_3$, $H_2SO_4$, $NO_x$, HC, CO, and other pollutants in the tail gas and adjusting a flowrate of a feedstock to the destination sulphuric acid plant based on the monitored concentration of one or more of $SO_2$, $SO_3$, $H_2SO_4$, $NO_x$, HC, CO, and other pollutants in the tail gas.

In some embodiments the process includes reducing the flowrate of the feedstock if the monitored concentration of one or more of $SO_2$, $SO_3$, $H_2SO_4$, $NO_x$, HC, CO, and other pollutants in the tail gas exceeds a predetermined threshold.

In some embodiments the process includes increasing the flowrate of the feedstock if the monitored concentration of one or more of $SO_2$, $SO_3$, $H_2SO_4$, $NO_x$, HC, CO, and other pollutants in the tail gas is below a predetermined threshold.

In some embodiments the process further includes monitoring a concentration of one or more of $SO_2$, $SO_3$, $H_2SO_4$, $NO_x$, HC, CO, and other pollutants in one or more of the tail gas and a process gas of the destination sulphuric acid plant and adjusting a flowrate of the tail gas to the destination sulphuric acid plant based on the concentration of one or more of $SO_2$, $SO_3$, $H_2SO_4$, $NO_x$, HC, CO, and other pollutants in the tail gas.

In some embodiments the process includes reducing the flowrate of the tail gas if the monitored concentration of one or more of $SO_2$, $SO_3$, $H_2SO_4$, $NO_x$, HC, CO, and other pollutants in the tail gas exceeds a predetermined threshold.

In some embodiments the process includes increasing the flowrate of the tail gas if the monitored concentration of one or more of $SO_2$, $SO_3$, $H_2SO_4$, $NO_x$, HC, CO, and other pollutants in the tail gas is below a predetermined threshold.

In some embodiments the process includes reducing the flowrate of the tail gas in response to determining that a concentration of $SO_2$ at an inlet of a first catalyst bed of a catalytic converter of the destination sulphuric acid plant is greater than about 12% mol/mol.

In some embodiments the process includes reducing the flowrate of the tail gas in response to determining that a concentration of $SO_2$ at a gas stack of the destination sulphuric acid plant is greater than about 500 ppm.

In some embodiments the process further includes monitoring an operating status of the destination sulphuric acid plant and adjusting a flowrate of the tail gas to the destination sulphuric acid plant based on the operating status of the destination sulphuric acid plant.

In some embodiments the process includes reducing the flowrate of the tail gas in response to determining that the destination sulphuric acid plant has commenced operating in start-up or upset conditions.

In some embodiment the process includes reducing the flowrate of the tail gas in response to determining that a temperature of a thermal stage of the destination sulphuric acid plant is less than about 900° C.

In some embodiments the process includes reducing the flowrate of the tail gas in response to determining that a temperature of a catalytic converter of the destination sulphuric acid plant is less than about 380° C.

In some embodiments the process further includes monitoring a concentration of $O_2$ in one or more of a feedstock to the source sulphuric acid plant, a feedstock to the destination sulphuric acid plant, the tail gas, a process gas of the source sulphuric acid plant, and a process gas of the destination sulphuric acid plant and enriching one or more of the feedstock to the source sulphuric acid plant, the feedstock to the destination sulphuric acid plant, the tail gas, the process gas of the source sulphuric acid plant, and the process gas of the destination sulphuric acid plant with an oxygen-containing gas based on the monitored concentration of $O_2$ by adjusting a flowrate of the oxygen-containing gas.

In some embodiments the process includes increasing the flowrate of the oxygen-containing gas in response to determining that the monitored concentration of $O_2$ at an inlet of the destination sulphuric acid plant is less than about 21% mol/mol.

In some embodiments the process further includes monitoring a concentration of one or more of $SO_2$, $SO_3$, $H_2SO_4$, $NO_x$, HC, CO, and other pollutants in one or more of a feedstock to the source sulphuric acid plant, a feedstock to the destination sulphuric acid plant, the tail gas, a process gas of the source sulphuric acid plant, and a process gas of the destination sulphuric acid plant and enriching one or more of the feedstock to the source sulphuric acid plant, the feedstock to the destination sulphuric acid plant, the tail gas, the process gas of the source sulphuric acid plant, and the process gas of the destination sulphuric acid plant with an oxygen-containing gas based on the monitored concentration of one or more of $SO_2$, $SO_3$, $H_2SO_4$, $NO_x$, HC, CO, and other pollutants by adjusting a flowrate of the oxygen-containing gas.

In some embodiments the process includes increasing the flowrate of the oxygen-containing gas in response to determining that the monitored concentration of $SO_2$ at an inlet of a first catalyst bed of a catalytic converter of the destination sulphuric acid plant is greater than about 12% mol/mol.

In some embodiments the process includes increasing the flowrate of the oxygen-containing gas in response to determining that the monitored concentration of $SO_2$ at a gas stack of the destination sulphuric acid plant is greater than about 500 ppm.

In some embodiments the process further includes monitoring an operating status of the destination sulphuric acid plant and adjusting a flowrate of an oxygen-containing gas to one or more of a feedstock to the source sulphuric acid plant, a feedstock to the destination sulphuric acid plant, the tail gas, a process gas of the source sulphuric acid plant, and a process gas of the destination sulphuric acid plant based on the operating status of the destination sulphuric acid plant by adjusting a flowrate of the oxygen-containing gas.

In some embodiments the process includes increasing the flowrate of the oxygen-containing gas in response to determining that a temperature of a thermal stage of the destination sulphuric acid plant is less than about 900° C.

In some embodiments the process includes increasing the flowrate of the oxygen-containing gas in response to determining that a temperature of a catalytic converter of the destination sulphuric acid plant is less than about 380° C.

In some embodiments the tail gas comprises a combined sulphur-containing species concentration of at least 1 ppmv.

In some embodiments the tail gas comprises a combined sulphur-containing species concentration of at least 100 ppmv.

In some embodiments the tail gas comprises a combined sulphur-containing species concentration of at least 1,000 ppmv.

In some embodiments the source sulphuric acid plant comprises the destination sulphuric acid plant and the gas transfer system transfers the tail gas from a location in the source sulphuric acid plant downstream from a catalytic converter of the source sulphuric acid plant to a location in the source sulphuric acid plant upstream from the catalytic converter of the source sulphuric acid plant.

Another aspect of the prevent invention provides a gas treatment system for reducing emissions of one or more of $SO_2$, $SO_3$, $H_2SO_4$, $NO_x$, HC, CO, and other pollutants from a tail gas. The system includes a source sulphuric acid plant, a destination sulphuric acid plant, and a gas transfer system operative to transfer the tail gas from the source sulphuric acid plant to the destination sulphuric acid plant when the source sulphuric acid plant is operating in start-up or upset conditions and the destination sulphuric acid plant is operating in steady state conditions.

In some embodiments the system further includes a control system operative to monitor a concentration of one or more of $SO_2$, $SO_3$, $H_2SO_4$, $NO_x$, HC, CO, and other pollutants in the tail gas and to adjust a flowrate of a feedstock to the destination sulphuric acid plant based on the monitored concentration of one or more of $SO_2$, $SO_3$, $H_2SO_4$, $NO_x$, HC, CO, and other pollutants in the tail gas.

In some embodiments the system further includes a control system operative to monitor a concentration of one or more of $SO_2$, $SO_3$, $H_2SO_4$, $NO_x$, HC, CO, and other pollutants in the tail gas and to adjust a flowrate of the tail gas to the destination sulphuric acid plant based on the monitored concentration of one or more of $SO_2$, $SO_3$, $H_2SO_4$, $NO_x$, HC, CO, and other pollutants in the tail gas.

In some embodiments the system further includes a control system operative to monitor an operating status of the destination sulphuric acid plant and to adjust a flowrate of the tail gas to the destination sulphuric acid plant based on the monitored operating status of the destination sulphuric acid plant.

In some embodiments the system further includes a control system operative to monitor a concentration of $O_2$ in one or more of a feedstock to the source sulphuric acid plant, a feedstock to the destination sulphuric acid plant, the tail gas, a process gas of the source sulphuric acid plant, and a process gas of the destination sulphuric acid plant and to adjust a flowrate of an oxygen-containing gas to one or more of the tail gas, the source sulphuric acid plant, the destination sulphuric acid plant, a source sulphuric acid plant feedstock, and a destination sulphuric acid plant feedstock based on the monitored concentration of $O_2$.

In some embodiments the system further includes a control system operative to monitor a concentration of one or more of $SO_2$, $SO_3$, $H_2SO_4$, $NO_x$, HC, CO, and other pollutants in one or more of a feedstock to the source sulphuric acid plant, a feedstock to the destination sulphuric acid plant, the tail gas, a process gas of the source sulphuric acid plant, and a process gas of the destination sulphuric acid plant and to adjust a flowrate of an oxygen-containing gas to one or more of the tail gas, the source sulphuric acid plant, the destination sulphuric acid plant, a source sulphuric acid plant feedstock, and a destination sulphuric acid plant feedstock based on the monitored concentration of one or more of $SO_2$, $SO_3$, $H_2SO_4$, $NO_x$, HC, CO, and other pollutants.

In some embodiments the system further includes a control system operative to monitor an operating status of the destination sulphuric acid plant and to adjust a flowrate of an oxygen-containing gas to one or more of a feedstock to the source sulphuric acid plant, a feedstock to the destination sulphuric acid plant, the tail gas, a process gas of the source sulphuric acid plant, and a process gas of the destination sulphuric acid plant based on the operating status of the destination sulphuric acid plant.

In some embodiments the tail gas comprises a combined sulphur-containing species concentration of at least 1 ppmv.

In some embodiments the tail gas comprises a combined sulphur-containing species concentration of at least 100 ppmv.

In some embodiments the tail gas comprises a combined sulphur-containing species concentration of at least 1,000 ppmv.

In some embodiments the source sulphuric acid plant comprises the destination sulphuric acid plant and the gas transfer system transfers the tail gas from a location in the source sulphuric acid plant downstream from a catalytic converter of the source sulphuric acid plant to a location in the source sulphuric acid plant upstream from the catalytic converter of the source sulphuric acid plant.

Another aspect of the present invention provides a GTP for reducing emissions of one or more of $SO_2$, $SO_3$, $H_2SO_4$, $NO_x$, HC, CO, and other pollutants from a tail gas. The process includes transferring the tail gas from at least one source of tail gas to at least one destination sulphuric acid plant via at least one gas transfer system.

In some embodiments some or all of a feedstock used by the at least one destination sulphuric acid plant is replaced with the tail gas from the at least one source of tail gas. The amount of the feedstock replaced may depend on the concentration of one or more of inerts, $O_2$, $SO_2$, $SO_3$, $H_2SO_4$, NOx, HC, CO, and other pollutants in the tail gas.

In some embodiments the process further includes adjusting a flowrate of the feedstock (such as ambient air) to the at least one destination sulphuric acid plant. The flowrate of the feedstock may be adjusted based on the concentration of one or more of $O_2$, $SO_2$, $SO_3$, $H_2SO_4$, $NO_x$, HC, CO, and other pollutants in the tail gas.

In some embodiments the process further includes adjusting a flowrate of the tail gas from the at least one source of tail gas to the at least one destination sulphuric acid plant. The flowrate of the tail gas may be adjusted based on the concentration of one or more of $O_2$, $SO_2$, $SO_3$, $H_2SO_4$, NOx, HC, CO, and other pollutants in the tail gas.

In some embodiments the process further includes enriching the tail gas with an oxygen-containing gas. In some embodiments the tail gas is enriched with the oxygen-containing gas when the oxygen content of the tail gas is less than about 21%.

In some embodiments the oxygen-containing gas is added to one or more of the at least one source of tail gas, a feedstock used by the at least one source of tail gas, upstream of gas handling processes of the at least one source of tail gas, the at least one gas transfer system, the at least one destination sulphuric acid plant, upstream of a gas blower of the at least one destination sulphuric acid plant, upstream of a thermal stage such as a sulphur furnace or regeneration furnace, upstream of a catalytic converter of the at least one destination sulphuric acid plant, upstream of a first stage of the catalytic converter of the at least one destination sulphuric acid plant, upstream of a final stage of the catalytic converter of the at least one destination sulphuric acid plant, and upstream of gas handling processes of the at least one destination sulphuric acid plant.

In some embodiments the process further includes preventing transfer of the tail gas from the at least one source of tail gas to the at least one destination sulphuric acid plant if the at least one source of tail gas malfunctions or otherwise ceases operating normally.

In some embodiments the process further includes transferring the tail gas from the at least one source of tail gas to the at least one destination sulphuric acid plant at one or more of the following points of entry: upstream of the catalytic converter of the at least one destination sulphuric acid plant, upstream of the first stage of the catalytic converter, upstream of the final stage of the catalytic converter, upstream of an absorption/condensation stage of the at least one destination sulphuric acid plant, upstream of the gas handling processes of the at least one destination sulphuric acid plant, upstream of the gas blower of the at least one destination sulphuric acid plant, upstream of a thermal stage such as a sulphur furnace or regeneration furnace, and upstream of a dry tower of the at least one destination sulphuric acid plant.

In some embodiments the process further includes compressing the tail gas from the at least one source of tail gas.

In some embodiments the at least one source of tail gas is operating under start-up conditions and/or upset conditions and/or steady state conditions.

In some embodiments the tail gas comprises a combined sulphur-containing species concentration of at least 1 parts per million by volume (ppmv). In some embodiments the tail gas comprises a combined sulphur-containing species concentration of at least 100 ppmv. In some embodiments the tail gas comprises a combined sulphur-containing species concentration of at least 1,000 ppmv.

In some embodiments the at least one source of tail gas is the at least one destination sulphuric acid plant.

In some embodiments the at least one source of tail gas comprises a sulphuric acid plant, such as a single-absorption sulphuric acid plant, and/or a sulphur recovery plant.

In some embodiments the at least one destination sulphuric acid plant comprises a double-absorption sulphuric acid plant and/or a tail gas scrubber.

In some embodiments the at least one source of tail gas is generated by a combustion process, such as operating an internal combustion engine.

Another aspect of the present invention provides a gas treatment system for reducing emissions of one or more of $SO_2$, $SO_3$, $H_2SO_4$, $NO_x$, HC, CO, and other pollutants from a tail gas. The system includes at least one destination sulphuric acid plant and at least one tail gas transfer system for transferring the tail gas to the at least one destination sulphuric acid plant.

In some embodiments each of the at least one destination sulphuric acid plant includes a feedstock control system for adjusting the flowrate of a feedstock to the destination sulphuric acid plant. The feedstock control system may adjust the flowrate of the feedstock to the corresponding destination sulphuric acid plant based on the concentration of one or more of $O_2$, $SO_2$, $SO_3$, $H_2SO_4$, $NO_x$, HC, CO, and other pollutants in the tail gas.

In some embodiments the at least one tail gas transfer system includes a tail gas control system for adjusting the flowrate of the tail gas to the at least one destination sulphuric acid plant. The tail gas control system may adjust the flowrate of the tail gas to the at least one destination sulphuric acid plant based on the concentration of one or more of $O_2$, $SO_2$, $SO_3$, $H_2SO_4$, $NO_x$, HC, CO, and other pollutants in the tail gas.

In some embodiments the gas treatment system further comprises a control system for adjusting the flowrate of a feedstock to the at least one destination sulphuric acid plant and for adjusting the flowrate of the tail gas to the at least one destination sulphuric acid plant. The control system may adjust the flowrate of the feedstock to the at least one destination sulphuric acid plant based on the concentration of one or more of $O_2$, $SO_2$, $SO_3$, $H_2SO_4$, $NO_x$, HC, CO, and other pollutants in the tail gas. The control system may adjust the flowrate of the tail gas to the at least one sulphuric acid plant based on the concentration of one or more of $O_2$, $SO_2$, $SO_3$, $H_2SO_4$, $NO_x$, HC, CO, and other pollutants in the tail gas.

In some embodiments the control system utilizes advanced process control routines that take into account process variables to maximize the combined production rate of the at least one destination sulphuric acid plant and the at least one source of tail gas and/or minimize the combined gas emissions of the at least one destination sulphuric acid plant and the at least one source of tail gas and/or minimize start-up time and/or minimize the total consumption of oxygen-enriched gas (if required) for the at least one source of tail gas and/or the at least one destination sulphuric acid plant. This requires one or more of:

monitoring one or more of the temperature, pressure, and concentration of one or more of $O_2$, $SO_2$, $SO_3$, $H_2SO_4$, $NO_x$, HC, CO, and other pollutants at the inlet and/or outlet of one or more process steps including, but not limited to, the thermal stage, catalytic converter beds, the feed gas, and the tail gas;
  monitoring one or more of the start-up time, preheat curve(s), and emission curve(s) of the at least one source of tail gas;
  monitoring one or more of the start-up time, total production rate, consumption of oxygen-enriched gas, and tail gas emissions of the at least one source of tail gas;
  making process simulations and calculations to predict the performance of the system over a start-up cycle;
  making adjustments to process parameters such as the tail gas feed flow rate, feedstock flow rate, oxygen-enriched gas flow rate;
  making adjustments to the feedstock flow rate of the at least one source of tail gas and/or adjusting plant process parameters as needed to maintain adequate operation of the at least one source of tail gas; and
  making adjustments to the feedstock flow rate of the at least one destination sulphuric acid plant and/or adjusting plant process parameters as needed to maintain adequate operation of the at least one destination sulphuric acid plant.

In some embodiments the at least one tail gas transfer system transfers the tail gas to the at least one destination sulphuric acid plant at one or more of the following points of entry: upstream of a catalytic converter, upstream of a first stage of the catalytic converter, upstream of a final stage of the catalytic converter, upstream of at least one absorption/condensation stage, upstream of gas handling processes, upstream of a gas blower, upstream of a thermal stage such as a sulphur furnace or regeneration furnace, and upstream of a dry tower. The catalytic converter may include at least one stage of catalytic conversion, such as $V_2O_5$-based catalytic conversion and/or Cs-based $V_2O_5$-based catalytic conversion. The absorption/condensation stage may comprise a gas-liquid contactor, such as a packed tower, and/or an indirect contact condenser, such as a shell and tube condenser.

In some embodiments the tail gas comprises a combined sulphur-containing species concentration of at least 1 ppmv. In some embodiments the tail gas comprises a combined sulphur-containing species concentration of at least 100 ppmv. In some embodiments the tail gas comprises a combined sulphur-containing species concentration of at least 1,000 ppmv.

In some embodiments the at least one tail gas transfer system transfers the tail gas from at least one source of tail gas.

In some embodiments the at least one source of tail gas is operating under start-up conditions and/or upset conditions and/or steady state conditions.

In some embodiments the at least one source of tail gas is the at least one destination sulphuric acid plant.

In some embodiments the at least one source of tail gas comprises one or more of a sulphuric acid plant, such as a single-absorption sulphuric acid plant, a combustion device, such as an internal combustion engine, and a sulphur recovery plant.

In some embodiments the at least one destination sulphuric acid plant comprises a double-absorption sulphuric acid plant and/or a tail gas scrubber.

In some embodiments the tail gas is supplemented with oxygen-containing gas. In some embodiments the tail gas is enriched with the oxygen-containing gas when the oxygen content of the tail gas is less than about 21%.

In some embodiments the oxygen-containing gas is added to one or more of the at least one tail gas transfer system, the at least one destination sulphuric acid plant, upstream of the gas blower of the at least one destination sulphuric acid plant, upstream of the catalytic converter of the at least one destination sulphuric acid plant, upstream of the first stage of the catalytic converter of the at least one destination sulphuric acid plant, upstream of a thermal stage such as a sulphur furnace or regeneration furnace, upstream of the final stage of the catalytic converter of the at least one destination sulphuric acid plant, upstream of the gas handling processes of the at least one destination sulphuric acid plant, the at least one source of tail gas, a feedstock used by the at least one source of tail gas, and upstream of gas handling processes of the at least one source of tail gas.

In some embodiments the at least one tail gas transfer system comprises a booster fan or other pressure increasing device conventionally known.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
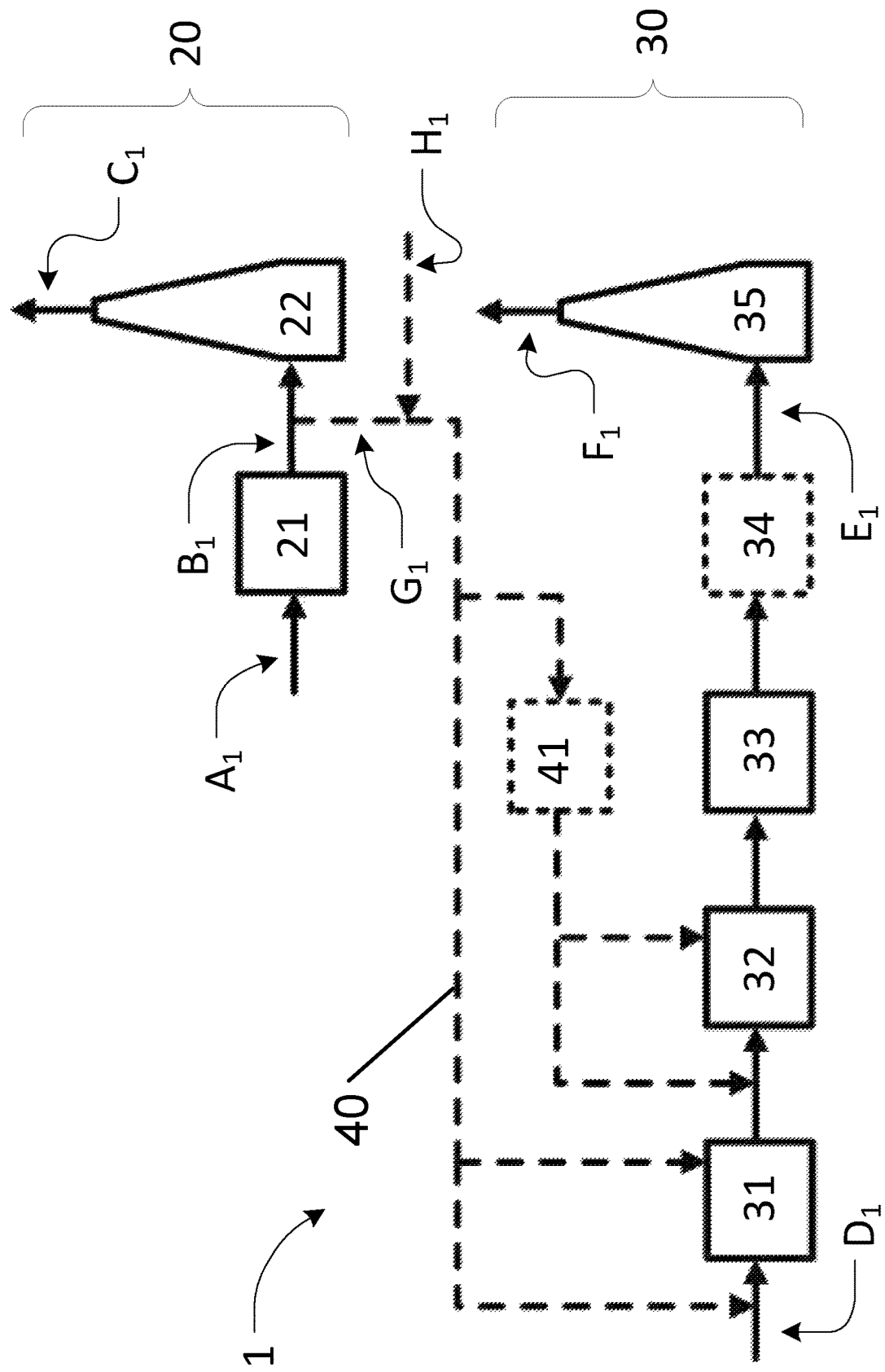
FIG. 1 is a schematic illustration of a gas treatment system according to an example embodiment of the present invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless context dictates otherwise, "start-up" (as used herein) refers to a process plant state wherein the unit operations of the plant have not reached desired conditions (i.e. one or more of desired temperature, pressure, species concentrations, and tail gas emissions to the environment). This may occur when the plant is preheating and/or increasing production rate and/or recovering from upset conditions.

Unless context dictates otherwise, "steady state" (as used herein) refers to a process plant state wherein the unit operations of the plant proceed under desired conditions (i.e. one or more of desired temperature, pressure, species concentrations, and tail gas emissions to the environment).

Unless context dictates otherwise, "upset" (as used herein) refers to a process plant state wherein the unit operations of the plant have deviated from steady state conditions.

Unless context dictates otherwise, "tail gas" (as used herein) refers to gas produced by a process plant that contains one or more of $SO_2$, $SO_3$, $H_2SO_4$, $NO_x$, HC, CO, and other pollutants. Non-limiting examples of tail gases include: industrial process gas, combustion gas, exhaust gas produced from diesel engines and generators, and sulphuric acid plant process gas.

Unless context dictates otherwise, "source of tail gas" (as used herein) refers to a process plant or component(s) thereof that produces tail gas. Non-limiting examples of sources of tail gas include: metallurgical acid plants, sulphur-burning sulphuric acid plants, acid regeneration plants, sulphur recovery plants, plants that deal with acid gas, and plants that use sulphur-containing fuels.

Unless context dictates otherwise, "destination sulphuric acid plant" (as used herein) refers to a sulphuric acid plant that receives tail gas from a source of tail gas. Destination sulphuric acid plants include at least one stage of catalytic conversion for converting $SO_2$ to $SO_3$ and/or at least one stage of absorption or condensation to produce liquid $H_2SO_4$. Non-limiting examples of destination sulphuric acid plants include: sulphur-burning sulphuric acid plants, metallurgical sulphuric acid plants, sulphuric acid regeneration plants, acid gas treatment sulphuric acid plants, and wet sulphuric acid plants.

Unless context dictates otherwise, "sulphur-containing species" (as used herein) includes the products of the combustion of sulphur-containing fuels or materials, such as one or more of $SO_2$, $SO_3$, $H_2SO_4$, $H_2S$, COS, and $CS_2$.

Unless context dictates otherwise, "sulphuric acid" ($H_2SO_4$) (as used herein) includes liquid sulphuric acid, vapour sulphuric acid, and sulphuric acid aerosols.

Unless context dictates otherwise, "nitrogen oxides" ($NO_x$) (as used herein) includes both fuel-$NO_x$ and thermal-$NO_x$ produced from combustion and other processes, comprising predominantly nitrogen oxide (NO), nitrogen dioxide ($NO_2$), and other oxides of nitrogen.

Unless context dictates otherwise, "hydrocarbons" (HC) (as used herein) refers to all hydrocarbons that may be present in tail gas such as products of incomplete combustion or volatile organic compounds (VOCs).

Unless context dictates otherwise, "carbon monoxide" (CO) (as used herein) refers to the product of incomplete oxidation of carbon-containing species.

Unless context dictates otherwise, "other pollutants" (as used herein) includes other trace species that may be present in tail gas such as particulate material (PM), ozone ($O_3$), sulphur (S), carbonyl sulphide (COS), carbon disulphide (CS), hydrogen sulphide (HS), ammonia ($NH_3$), hydrogen ($H_2$), etc.

Unless context dictates otherwise, "oxygen-containing gas" (as used herein) includes pure oxygen gas and gas mixtures containing oxygen.

Unless context dictates otherwise, "high-sulphur content" (as used herein) refers to a sulphur content between about 0.1% w/w (weight per weight) and about 1% w/w. In some embodiments the sulphur content is between about 1% w/w and about 5% w/w. In some embodiments the sulphur content is greater than about 5% w/w.

Unless context dictates otherwise, "low-sulphur content" (as used herein) refers to a sulphur content that is less than about 0.1% w/w Unless context dictates otherwise, "inlet" and "inlet end" (as used herein in relation to a gas treatment system and components thereof) mean the location(s) wherein gas to be treated is introduced into the gas treatment system or components thereof.

Unless context dictates otherwise, "outlet" and "outlet end" (as used herein in relation to a gas treatment system and components thereof) mean the location(s) wherefrom treated gas exists the gas treatment system or components thereof.

Unless context dictates otherwise, "upstream" (as used herein in relation to a gas treatment system and components thereof) means a position that is more near the inlet end of the gas treatment system relative to a position that is more near the outlet end.

Unless context dictates otherwise, "downstream" (as used herein in relation to a gas treatment system and components thereof) means a position opposite to upstream, i.e. a position that is more near the outlet end of the gas treatment system relative to a position that is more near the inlet end.

Unless the context dictates otherwise, "plant" (as used herein) refers to a distinct industrial site for carrying on industrial processes.

Unless context dictates otherwise, "feedstock" (as used herein) means a raw material supplied to a sulphuric acid plant or component(s) thereof, including (but not limited to) one or more of elemental sulphur, sulphur dioxide ($SO_2$), hydrogen sulfide ($H_2S$), sulphur-containing organic compounds, and spent acid (e.g. spent sulphuric acid, etc.) and/or sludge obtained from alkylation processes.

Unless context dictates otherwise, "about" (as used herein) means near the stated value (i.e. within ±10% of the stated value).

Some embodiments of the present invention provide GTPs and systems to reduce tail gas emissions of one or more of $SO_2$, $SO_3$, and $H_2SO_4$. Additional abatement for one or more of $NO_x$, HC, CO, and other pollutants may be provided.

The GTPs and systems according to some embodiments of the present invention apply a destination sulphuric acid plant and a gas transfer system to process tail gas from a source of tail gas. Such embodiments allow the source plant to start-up with zero emissions without significantly compromising destination sulphuric acid plant productivity. The destination sulphuric acid plant receives all or part of the tail gas from the source of tail gas via the gas transfer system. The tail gas replaces some or all of the combustion gas and/or air feed and/or dilution gas and/or quench gas used by the destination sulphuric acid plant. The net effect of this transfer of tail gas is the reduction or elimination of emissions from the source of tail gas by means of the unit operations taking place in the destination sulphuric acid plant. The destination sulphuric acid plant ideally operates normally; however, in some embodiments some reduction in the operation efficiency of the destination sulphuric acid plant may be encountered. The destination sulphuric acid plant may be supplemented with oxygen to improve performance. In some embodiments the destination sulphuric acid plant includes at least one stage of catalytic conversion and/or at least one stage of absorption or condensation. The thermal and catalytic unit operations of the destination sulphuric acid plant are used to oxidize one or more of sulphur-containing species, HC, CO, and $NO_x$. The resulting oxidation products of sulphur-containing species are then absorbed/condensed to produce liquid $H_2SO_4$.

Prior to tail gas transfer to a destination sulphuric acid plant, the tail gas may be fed to a wet gas cleaning system and/or furnace to eliminate remnant, unburnt HC. Conventional tail gas sources typically employ one or more of instrumentation, shut-down procedures, and purge procedures to eliminate unburnt HC from tail gas.

Some embodiments may be provided at sites having at least one sulphuric acid plant and at least one source of tail gas. Some embodiments may be beneficial during plant start-up and/or during upset conditions where tail gas can have unusually high concentrations of pollutants that exceed environmental and/or health and/or safety regulatory limits.

In some embodiments the systems and methods are used to treat tail gas having a combined sulphur-containing species concentration of more than 1 ppmv. In some embodiments the systems and methods are used to treat tail gas having a combined sulphur-containing species concentration of more than 100 ppmv. In some embodiments the systems and methods are used to treat tail gas having a combined sulphur-containing species concentration of more than 1,000 ppmv. In some embodiments the systems and methods are used to treat tail gas having a combined sulphur-containing species concentration of more than 10,000 ppmv.

Some embodiments have substantially zero discharge of water pollutants to the environment. Some embodiments reduce or eliminate some of the issues associated with conventional tail gas cleaning systems that require the use of chemicals and/or consume energy and/or produce by-products that need to be disposed of.

Some embodiments of the present invention reduce the time required to preheat and start-up a sulphuric acid plant. Typically, preheating the catalyst beds of a sulphuric acid plant to temperatures within the range of about 380° C. to about 450° C. can take between 12 to 48 hours. To maximize conversion and reduce start-up emissions, the beds must be preheated before $SO_2$ gas is introduced for processing. Some embodiments reduce preheat time by 8 or more hours by feeding $SO_2$ gas to the catalyst beds when only one or more bed has reached the target temperature (i.e. about 380° C. to about 450° C.). The temperature of the other beds may be much lower. For example, the temperature of the other beds may be above the sulphuric acid dew point of the process gas (i.e. typically between about 110° C. to about 150° C. in dry-gas sulphuric acid plants and higher in wet-gas sulphuric acid plants) when $SO_2$ gas is introduced. Since the systems and methods according to some embodiments may be used to reduce emissions from the sulphuric acid plant in start-up mode, the exothermic heat of $SO_2$ oxidation in the bed having the target temperature is used to preheat the other catalyst beds. Thus, start-up is not limited by $SO_2$ emissions and time may be reduced and/or preheating fuel may be conserved.

Some embodiments of the present invention provide an advanced control system that maximizes the combined production rate of a source of tail gas and a destination sulphuric acid plant, while maintaining net emissions below a certain threshold which may be defined by environmental regulations and/or requirements. The control system may minimize start-up time of the source of tail gas by adjusting process parameters during preheat and start-up. The control system may monitor one or more of the inlet and outlet temperature of the thermal stage (such as a sulphur furnace), the inlet and outlet temperatures of all catalytic beds, the $SO_2$ and $O_2$ concentration at the inlet and outlet of the thermal stage and each catalyst bed, gas flow rates, and stack $SO_2$ emissions in real time. The control system may be used to control the rate of tail gas transfer from the source of tail gas to the destination sulphuric acid plant and/or the start-up rate of the source of tail gas. Operating set points of each catalyst bed may be optimized in view of the overall performance of the source of tail gas and/or the destination sulphuric acid plant.

In some embodiments the control system utilizes advanced process control routines that take into account process variables to maximize the combined production rate (such as acid production) of the at least one destination sulphuric acid plant and the at least one source of tail gas and/or minimize the combined gas emissions (in terms of peak stack $SO_2$ concentration and total $SO_2$ emissions) of the at least one destination sulphuric acid plant and the at least one source of tail gas and/or minimize start-up time and/or minimize the total consumption of oxygen-enriched gas (if required, from an oxygen storage tank and/or an oxygen plant) for both the at least one source of tail gas and/or the at least one destination sulphuric acid plant. This may require one or more of:

monitoring one or more of the temperature, pressure, and concentration of one or more of $O_2$, $SO_2$, $SO_3$, $H_2SO_4$, $NO_x$, HC, CO, and other pollutants at the inlet and/or outlet of one or more process steps including, but not limited to, the thermal stage, catalytic converter beds, the feed gas, and the tail gas;

monitoring one or more of the start-up time, preheat curve(s), and emission curve(s) of the at least one source of tail gas;

monitoring one or more of the start-up time, total production rate, consumption of oxygen-enriched gas, and tail gas emissions of the at least one source of tail gas;

making process simulations and calculations to predict the performance of the system over a start-up cycle;

making adjustments to process parameters such as the tail gas feed flow rate, feedstock flow rate, oxygen-enriched gas flow rate. For example, the tail gas and feedstock flow rate to the destination sulphuric acid plant may be adjusted to maintain a sulphur furnace temperature between about 900° C. and about 1200° C. The feedstock of the sulphur-containing species may be adjusted to obtain an adequate $SO_2$ concentration at the destination sulphuric acid plant. The oxygen-enriched gas flow rate may be adjusted to maintain high conversion of $SO_2$ in the catalytic converter;

making adjustments to the feedstock flow rate of the at least one source of tail gas and/or adjusting plant process parameters as needed to maintain adequate operation of the at least one source of tail gas. For example, the feedstock flow rate and the concentration of one or more of $O_2$, $SO_2$, $SO_3$, $H_2SO_4$, $NO_x$, HC, CO, and other pollutants at which the source of tail gas is operated may be adjusted to correspond with the processing capacity of the destination sulphuric acid plant; and making adjustments to the feedstock flow rate of the at least one destination sulphuric acid plant and/or adjusting plant process parameters as needed to maintain adequate operation of the at least one destination sulphuric acid plant. For example, the rate of feedstock processing (such as the rate of sulphur addition to the furnace in a sulphur-burning plant, the rate of air dilution in a metallurgical sulphuric acid plant, or the rate of regeneration feed to the furnace of an acid regeneration plant) may be adjusted to optimize the performance of the destination sulphuric acid plant when receiving tail gas.

In some embodiments making adjustments to process parameters includes one or more of the following:

monitoring the temperature of a thermal stage (e.g. a sulphur furnace, etc.) of the at least one destination sulphuric acid plant. If the monitored temperature is less than a desired temperature (typically between about 900° C. to about 1200° C.), then the flow of tail gas and/or the flow of feedstock is partially or completely diverted downstream of the thermal stage. This may be accomplished by adjusting one or more control valves and/or gas dampers;

monitoring the concentration of $SO_2$ at an inlet of a first catalytic bed of a catalytic converter of the at least one destination sulphuric acid plant. If the monitored $SO_2$ concentration is greater than a desired $SO_2$ concentration (typically about 12% mol/mol), then the flow of air feedstock to the destination sulphuric acid plant is increased and/or the flow of tail gas to the destination sulphuric acid plant is decreased and/or the flow of sulphur-containing species (i.e. feedstock) to the destination sulphuric acid plant is decreased. This may be accomplished by adjusting one or more control valves and/or gas dampers and/or adjusting the speed of a variable frequency drive in one or more gas feedlines and/or adjusting one or more control valves and/or gas dampers in the sulphur-containing species (i.e. feedstock) feedline to a thermal stage (e.g. a sulphur furnace, etc.); and monitoring the concentration of $O_2$ at an inlet of the at least one destination sulphuric acid plant. If the concentration of $O_2$ is less than a desired $O_2$ concentration (typically about 21% mol/mol for a sulphur-burning plant), then the flow of oxygen-enriched gas is increased. This may be accomplished by adjusting one or more control valves and/or gas dampers and/or adjusting the speed of a variable frequency drive in an oxygen-enriched gas feedline.

Indirect measurements may be used to identify the adequate operating conditions of a plant. For example, gas concentration monitoring may be performed at the tail gas outlet, or at other plant locations using similar control actions.

Figure 3:
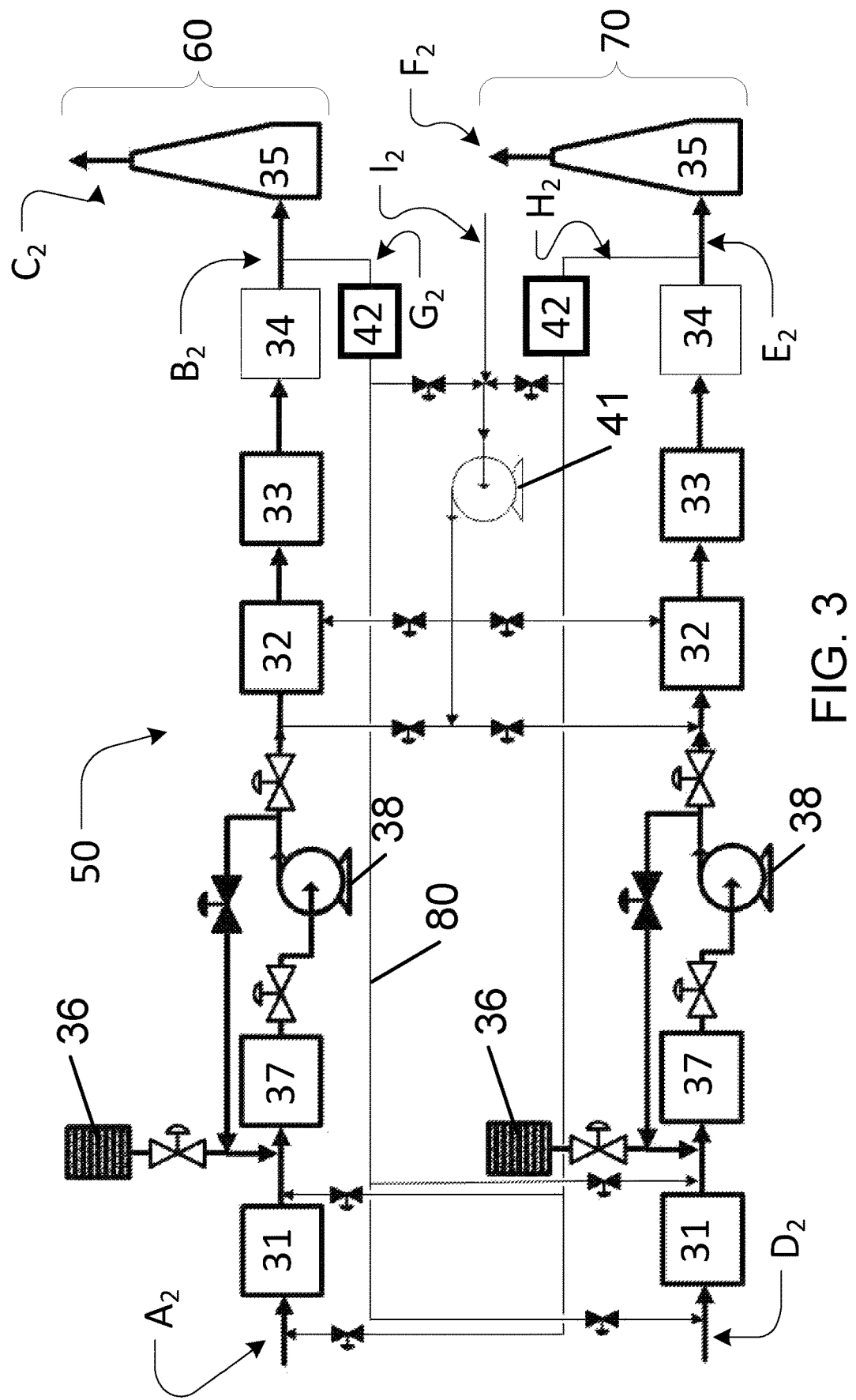
FIG. 3 is a schematic illustration of a gas treatment system according to an example embodiment of the present invention, wherein a source of tail gas and a destination plant each comprise a sulphuric acid plant.

In some embodiments making adjustments to the feedstock flow rate of the at least one source of tail gas and/or adjusting plant process parameters as needed to maintain adequate operation of the at least one source of tail gas includes one or more of the following:

monitoring the concentration of $SO_2$ at the stack of at the least one destination sulphuric acid plant. If the concentration of $SO_2$ is greater than a desired $SO_2$ concentration (typically between about 0 ppm and about 500 ppm), then the rate of $SO_2$ processing and/or the rate of sulphur burning and/or the production rate of the source of tail gas is lowered;

monitoring the concentration of $SO_2$ at an inlet of a first catalytic bed of a catalytic converter of the at least one destination sulphuric acid plant. If the concentration of $SO_2$ is greater than a desired $SO_2$ concentration (typically about 12% mol/mol), then the rate of $SO_2$ processing and/or the rate of sulphur burning and/or the production rate of the source of tail gas is lowered; and performing one or more of the following actions during start-up of at least one source of tail gas:

- recording the process parameters measured for the at least one source of tail gas and at least one destination sulphuric acid plant using a control system;
- operating the at least one destination sulphuric acid plant under steady-state conditions;
- starting-up the at least one source of tail gas as is conventionally known;
- transferring tail gas from the at least one source of tail gas to the at least one destination sulphuric acid plant (see, for example, FIG. 3). It may be desirable to transfer tail gas before the catalyst of the at least one source of tail gas begins to release $SO_2$ and/or $SO_3$ gases while preheating the converter;
- preheating the sulphuric acid inventory used by the absorption towers of the at least one source of tail gas in start-up conditions to minimize acid mist carry-over from the acid towers of the source of tail gas. The acid may be preheated by adding heat to the source of tail gas and/or by cross-flowing hot sulphuric acid from the acid system of the at least one destination sulphuric acid plant to the acid system of the source of tail gas. The increase in acid temperature may reduce the carryover of acid mist from the source of tail gas towers and/or reduce the acid mist load at the tail gas outlet of the source of tail gas, thereby simplifying the operation and improving the reliability of the gas transfer system;
- preheating the at least one source of tail gas until at least one catalyst bed (e.g. the first catalytic bed) reaches a desired feed temperature greater than about 360° C. In some embodiments the desired feed temperature is between about 360° C. and about 450° C. Only one catalyst bed needs to reach the desired feed temperature; however, it may be desirable to heat more than one bed to the desired feed temperature. The shortest start-up time is typically achieved by preheating only one catalyst bed to the desired feed temperature;
- introducing $SO_2$ gas to the converter of the source of tail gas. This may be achieved by feeding feedstock gas rich in $SO_2$ and/or by adding sulphur-containing species to a sulphur furnace;
- adding oxygen-enriched gas to the tail gas of the source of tail gas as needed to balance the oxygen content of the destination sulphuric acid plant. This may require monitoring $SO_2$ and/or $O_2$ concentrations and/or monitoring the temperatures of the catalytic converter and/or the thermal stages of the destination sulphuric acid plant;
- increasing the source of tail gas production rate by increasing the feedstock $SO_2$ concentration and/or throughput; and
- monitoring and controlling process parameters to maximize the production rate of the at least one sulphuric acid plant and/or the at least one source of tail gas and/or to minimize the gas emissions of the at least one destination sulphuric acid plant and/or the at least one source of tail gas and/or to minimize start-up time of the source of tail gas and/or to minimize the total consumption of oxygen-enriched gas (if required).

In some embodiments making adjustments to the feedstock flow rate of at least one destination sulphuric acid plant and/or adjusting plant process parameters as needed to maintain adequate operation of the at least one destination sulphuric acid plant includes one or more of the following:

- monitoring the concentration of $SO_2$ at the stack of the at least one destination sulphuric acid plant. If the concentration of $SO_2$ is greater than a desired $SO_2$ concentration (typically between about 0 ppm to about 500 ppm), then the rate of $SO_2$ processing and/or the rate of sulphur burning and/or the production rate of the destination sulphuric acid plant is reduced. This may be required if there is not enough oxygen-enriched gas available to balance the load of $O_2$ to the destination sulphuric acid plant;
- monitoring the concentration of $O_2$ at an inlet of the at least one destination sulphuric acid plants is monitored. If the concentration of $O_2$ is less than a desired $O_2$ concentration (typically about 21% mol/mol for a sulphur-burning plant), then the rate of $SO_2$ processing and/or the rate of sulphur burning and/or the production rate of the destination sulphuric acid plant is reduced. This may be required if there is not enough oxygen-enriched gas available to balance the load of $O_2$ to the destination sulphuric acid plant;
- monitoring the gas temperatures around gas-to-gas heat exchanges and the catalytic converter of the at least one destination sulphuric acid plant. If an adequate temperature profile is not achieved for the converter (typically with feed gas temperatures between about 380° C. and about 450° C.), then the rate of $SO_2$ processing and/or the rate of sulphur burning and/or the production rate of the destination sulphuric acid plant is adjusted. This may be required if there is not enough oxygen-enriched gas available to balance the load of $O_2$ to the destination sulphuric acid plant; and
- monitoring the gas temperatures around the catalytic converter of the at least one sulphuric acid plant. If the feed gas temperature of the converter of any of the catalyst beds is lower than a desired temperature (typically between about 380° C. and about 450° C.), then heat is supplemented to the destination sulphuric acid plant. This may be achieved using a preheat system, which is typically available in metallurgical acid plants.

Figure 2:
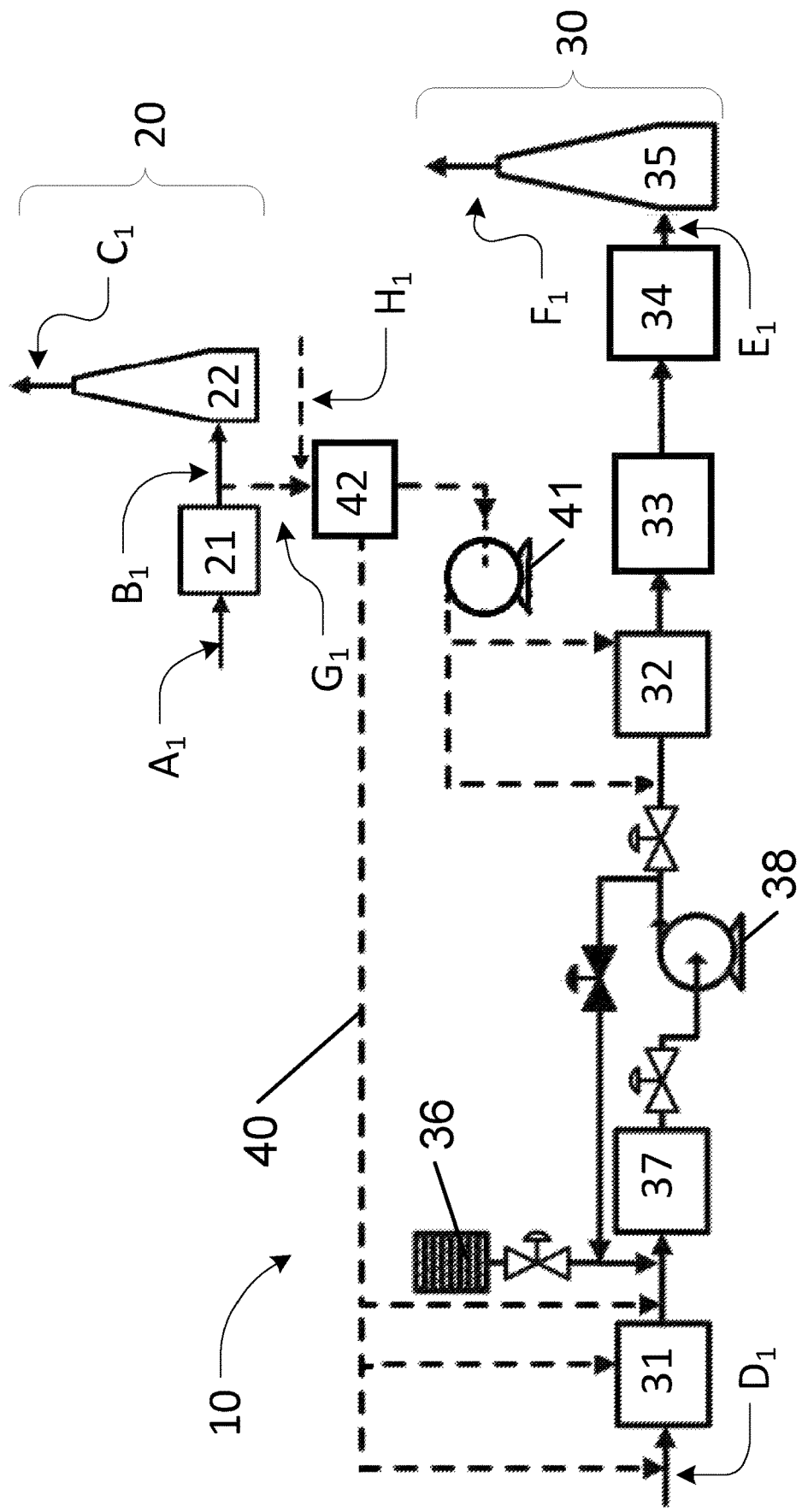
FIG. 2 is a schematic illustration of a gas treatment system according to an example embodiment of the present invention.

Systems 1 and 10 for reducing emissions of one or more of $SO_2$, $SO_3$, $H_2SO_4$, $NO_x$, HC, CO, and other pollutants from tail gas produced by a source of tail gas 20 according to example embodiments of the present invention are shown in FIGS. 1 and 2, respectively. Many features and components of system 10 are similar to features and components of system 1, with the same reference numerals being used to indicate features and components that are similar between the embodiments. System 1 includes a destination sulphuric acid plant 30 and a gas transfer system 40. Feedstock $A_1$ is fed to unit operations 21 of source of tail gas 20. Persons skilled in the art will recognize that unit operations 21 depend on the process plant type of source of tail gas 20. For example, unit operations 21 may include multiple unit operations and/or equipment. Tail gas $B_1$ is produced via operations 21 and may be fed into a gas stack 22 before it is discharged as gas $C_1$ to the environment. Feedstock $D_1$ is fed to gas handling processes 31 of destination sulphuric acid plant 30. Feedstock $D_1$ may comprise one or more of combustion gas, air feed, dilution gas, quench gas, and a feedstock (including, but not limited to, sulphur, acid gas, metallurgical off-gas, and furnace off-gas). Persons skilled in the art will recognize that the specific nature of gas handling processes 31 will depend on the configuration of destination sulphuric acid plant 30. For example, for a metallurgical sulphuric acid plant, gas handling processes 31 may include one or more of gas cleaning, heat exchange, gas compression, and gas drying unit operations. For an acid regeneration plant, gas handling processes 31 may include one or more of heating in a regeneration furnace, gas cleaning, heat exchange gas compression, and gas drying unit operations. For a sulphur-burning acid plant, gas handling processes 31 may include one or more of gas compression, gas drying, sulphur burning, and heat exchange unit operations.

Destination sulphuric acid plant 30 includes at least one stage of catalytic conversion and/or at least one stage of absorption or condensation. In some embodiments destination sulphuric acid plant 30 includes a catalytic converter 32 and an absorption/condensation stage 33. Catalytic converter 32 facilitates the following reaction:

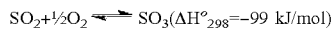

$$SO_2 + \tfrac{1}{2}O_2 \rightleftharpoons SO_3 (\Delta H^\circ_{298} = -99 \text{ kJ/mol})$$

Absorption/condensation stage 33 facilitates the following hydration reaction:

$$SO_3 + H_2O \rightarrow H_2SO_4 (\Delta H^\circ_{298} = -101 \text{ kJ/mol})$$

Converter 32 is located upstream of absorption/condensation stage 33 and downstream of gas handling processes 31. Catalytic converter 32 may include catalytic conversion and gas cooling unit operations. In some embodiments one to five catalytic conversion stages are provided. At least one stage of catalytic converter 32 typically includes a high-vanadium catalyst in a packed bed. Catalytic converter 32 may be of adiabatic or quasi-isothermal configuration. In some embodiments catalytic converter 32 comprises at least one stage of $V_2O_5$-based catalyst. In some embodiments catalytic converter 32 comprises at least one stage of Cs-promoted $V_2O_5$-based catalyst. In some embodiments the temperature of the process gas in catalytic converter 32 under steady state conditions is between about 370° C. to about 650° C.

Absorption/condensation stage 33 may include gas cooling, absorption and/or condensation unit operations. In some embodiments one or more stages of absorption or condensation are provided. In some embodiments acid mist removal (not shown) is provided downstream of absorption/condensation stage 33. In some embodiments at least one stage of absorption/condensation stage 33 comprises a gas-liquid contactor and/or an indirect contact condenser. In some embodiments the gas-liquid contactor comprises a packed tower. In some embodiments the temperature of the process gas in the gas-liquid contactor under steady state conditions is between about 25° C. and about 300° C. In some embodiments the temperature of the process gas in the gas-liquid contactor under steady state conditions is between about 60° C. and about 200° C. In some embodiments the temperature of the process gas in the gas-liquid contactor under steady state conditions is between about 70° C. and about 120° C. In some embodiments the indirect contact condenser comprises a shell and tube condenser.

Destination sulphuric acid plant 30 includes a sulphuric acid plant gas stack 35 at an outlet end thereof. Tail gas $E_1$ produced by destination sulphuric acid plant 30 may be fed into gas stack 35 before it is discharged as gas $F_1$ to the environment. Destination sulphuric acid plant 30 further includes one or more downstream processes 34 located upstream of gas stack 35. Downstream processes 34 may include an absorption/condensation stage and/or tail gas scrubbing. Destination sulphuric acid plant 30 of system 10 further includes a gas dryer or dry tower 37 located upstream of catalytic converter 32, a gas blower 38 located upstream of catalytic converter 32, and an air inlet 36 located upstream of catalytic converter 32. In some embodiments the thermal stage required by sulphur-burning and acid regeneration plants may be located upstream of the catalytic converter.

Tail gas $B_1$ produced by source of tail gas 20 may be transferred to destination sulphuric acid plant 30 via gas transfer system 40 as tail gas $G_1$. Gas transfer system 40 may include one or more of gas ducting, gas dampers, and valves. Tail gas $G_1$ transferred to sections of destination sulphuric acid plant 30 under suction may not require additional driving force. However, tail gas $G_1$ transferred to sections of destination sulphuric acid plant 30 under positive pressure may require gas compression (for example, by means of a booster fan or other pressure increasing device conventionally known). In such embodiments tail gas $G_1$ may be fed through tail gas compressor 41. Tail gas $B_1$ may be heated or cooled depending on the requirements of destination sulphuric acid plant 30 and/or the point of entry into destination sulphuric acid plant 30.

Tail gas $G_1$ may be used to replace or supplement feedstock $D_1$. For example, an amount of feedstock $D_1$ may be replaced with tail gas $G_1$ depending on the concentration of one or more of $O_2$, $SO_2$, $SO_3$, $H_2SO_4$, $NO_x$, HC, CO, and other pollutants in tail gas $G_1$. Where tail gas $G_1$ contains oxygen, it may be used to replace or supplement feed air from an air inlet (for example, air inlet 36 shown in FIG. 2). Where tail gas $G_1$ contains $SO_2$, it may be used to replace or supplement a sulphur feedstock. Where tail gas $G_1$ contains fuel, it may be used to replace or supplement a fuel feedstock.

In some embodiments a control system (for example, control system 42 shown in FIG. 2) is used to adjust the flowrate of tail gas $G_1$ and/or feedstock $D_1$ into destination sulphuric acid plant 30. For example, control system 42 may adjust the gas dampers and/or valves of gas transfer system 40. In some embodiments control system 42 adjusts the flowrate of tail gas $G_1$ to destination sulphuric acid plant 30 based on the concentration of $O_2$, $SO_2$, $SO_3$, $H_2SO_4$, $NO_x$, HC, CO, and other pollutants in tail gas $G_1$. In some embodiments control system 42 prevents the transfer of tail gas $G_1$ to destination sulphuric acid plant 30 if source of tail gas 20 malfunctions or otherwise ceases operating normally. In some embodiments control system 42 adjusts the flowrate of feedstock $D_1$ to destination sulphuric acid plant 30 based on the concentration of $O_2$, $SO_2$, $SO_3$, $H_2SO_4$, $NO_x$, HC, CO, and other pollutants in tail gas $G_1$. In some embodiments control system 42 adjusts parameters within destination sulphuric acid plant 30 to maintain desired operation and/or a desired plant production rate. For example, control system 42 may adjust feed rates of one or more of air, sulphur-containing species (such as $SO_2$) and oxygen-containing gas. Under source of tail gas 20 start-up conditions, control system 42 may add oxygen-containing gas $H_1$ to tail gas $G_1$ so that tail gas $G_1$ may replace or supplement feedstock $D_1$ while maintaining adequate operation/production of destination sulphuric acid plant 30. In some embodiments control system 42 adjusts the flowrate of oxygen-containing gas $H_1$ to destination sulphuric acid plant 30.

The point of entry of tail gas $G_1$ into destination sulphuric acid plant 30 depends on one or more of total gas flows, the composition of the gases involved, and the equipment available in destination sulphuric acid plant 30. Typically, tail gas $G_1$ is fed to destination sulphuric acid plant 30 at a single point of entry. In some other embodiments, tail gas $G_1$ is fed to destination sulphuric acid plant 30 at multiple points of entry. Persons skilled in the art will recognize that a sulphuric acid plant may have many possible points of entry. The following are example points of entry:

- Upstream of gas handling processes 31. This point of entry may be advantageous if tail gas $G_1$ has a load of particular matter (PM) or other pollutants that are not treatable by destination sulphuric acid plant 30. A glass cleaning section may be provided upstream of gas handling process 31 in such instances.
- Upstream of a gas blower 38 (see FIG. 2). This point of entry may provide suction and eliminate or lessen the need for additional equipment to transfer tail gas $G_1$ to destination sulphuric acid plant 30.
- Upstream of a dry tower 37 (see FIG. 2). This point of entry may be advantageous to maintain the water balance of tail gas $G_1$ where tail gas $G_1$ contains moisture.
- Upstream of a thermal stage (not shown) such as a sulphur furnace or a regeneration furnace. Tail gas $G_1$ entering destination sulphuric acid plant 30 at this point of entry may be adjusted to maintain adequate gas temperatures at the furnace. In this way, the control system may be used to feed part of the tail gas upstream of the thermal stage and the remaining tail gas downstream of the thermal stage to effectively maintain a desired furnace temperature.
- Upstream of a first stage of catalytic converter 32. Tail gas $G_1$ that enters destination sulphuric acid plant 30 at this point of entry will be treated by all stages of catalytic converter 32.
- Upstream of a final stage of catalytic converter 32 (for example, upstream of stage four or five). This point of entry may minimize the impact of tail gas $G_1$ on the operation of destination sulphuric acid plant 30. In some embodiments this point of entry minimizes equipment pressure drop. Accordingly, this point of entry may be advantageous where tail gas $G_1$ is of large volumetric flow and/or of low oxygen content. Additional catalytic conversion stages may be provided as required.

Depending on composition, tail gas $G_1$ may have one or more of the following effects on destination sulphuric acid plant 30:

- Sulphur dioxide. Destination sulphuric acid plant 30 converts $SO_2$ gas into $SO_3$ in catalytic converter 32. $SO_3$ is subsequently absorbed or condensed into $H_2SO_4$ in absorption/condensation stage 33 potentially increasing the $H_2SO_4$ production capacity of destination sulphuric acid plant 30. The $SO_2$ concentration of destination sulphuric acid plant 30 is typically controlled by plant operators. Since the $SO_2$ concentration of tail gas $G_1$ is typically much lower than the $SO_2$ concentration of feedstock $D_1$, the impact of $SO_2$ in tail gas $G_1$ on plant operation is typically small. Abatement of $SO_2$ emissions from tail gas $G_1$ is substantially achieved.
- Sulphur trioxide. Destination sulphuric acid plant 30 converts $SO_3$ gas into $H_2SO_4$ in absorption/condensation stage 33. Abatement of $SO_3$ emissions from tail gas $G_1$ is substantially achieved.
- Sulphuric acid. $H_2SO_4$ in the form of mist and acid vapours dissociates in the high temperature sections of destination sulphuric acid plant 30 upstream of absorption/condensation stage 33 to produce $SO_3$ and $H_2O$. The dissociation of $H_2SO_4$ is substantially complete at temperatures greater than about 400° C. Such temperatures are typical of furnaces and catalytic converters. Abatement of $H_2SO_4$ emissions from tail gas $G_1$ is substantially achieved where the point of entry of tail gas $G_1$ into destination sulphuric acid plant 30 is at gas handling processes 31 and/or at locations upstream of absorption/condensation stage 33 so long as temperatures at these upstream locations are greater than about 400° C. Abatement of $H_2O_4$ emissions from tail gas $G_1$ is substantially achieved at lower temperatures where tail gas $G_1$ is treated by the gas cleaning equipment of destination sulphuric acid plant 30.
- Nitrogen oxides. In some embodiments destination sulphuric acid plant 30 includes provisions to treat $NO_x$ gases. Some of these provisions convert $NO_x$ into $N_2$ by means of gas-phase catalytic reduction. For example, selective catalytic reduction (SCR) technologies can be effective in removing $NO_x$ from tail gas. In some other embodiments $NO_x$ is captured in demister drains and treated using a number of liquid-phase methods. These methods may involve one or more of acid segregation, addition of chemicals, and acid dilution. Depending on the destination sulphuric acid plant equipment available, abatement of $NO_x$ emissions from tail gas $G_1$ may be at least partially achieved. For example, abatement of $NO_x$ emissions from tail gas $G_1$ may be at least partially achieved without disrupting destination sulphuric acid plant 30 where $NO_x$ concentrations of tail gas $G_1$ are less than a few hundred parts per millions (ppm). At higher concentrations (for example, $NO_x$ concentrations in the thousands ppm to tens of thousands ppm), modifications to destination sulphuric acid plant 30 parameters (such as the furnaces) may be required to substantially achieve $NO_x$ abatement.
- Hydrocarbons. HC may be combusted to produce $CO_2$ and $H_2O$ where tail gas $G_1$ is fed into destination sulphuric acid plant 30 upstream of a furnace. Any remaining HC transferred to catalytic converter 32 may be oxidized. Some additional heat release may be expected and may be recovered by heat transfer equipment of destination sulphuric acid plant 30. Abatement of HC emissions from tail gas $G_1$ may be substantially achieved. For example, abatement of HC emissions from tail gas $G_1$ may be at least partially achieved without disrupting destination sulphuric acid plant 30 where HC concentrations of tail gas $G_1$ are less than a few hundred ppm. At higher concentrations (for example, HC concentrations in the thousands ppm to tens of thousands ppm), modifications to destination sulphuric acid plant 30 parameters (such as the furnaces) may be required to substantially achieve HC abatement.
- Carbon monoxide. CO may be oxidized to produce $CO_2$ where tail gas $G_1$ is fed into destination sulphuric acid plant 30 upstream of a furnace. CO may oxidize in catalytic converter 32. In particular, CO may better oxidize in the higher temperature conditions of the first stages of catalytic converter 32. Additional heat release may be expected and may be recovered by heat transfer equipment of destination sulphuric acid plant 30. Abatement of CO emissions from tail gas $G_1$ may be substantially achieved. For example, abatement of CO emissions from tail gas $G_1$ may be at least partially achieved without disrupting destination sulphuric acid plant 30 where CO concentrations of tail gas $G_1$ are less than a few hundred ppm. At higher concentrations (for example, CO concentrations in the thousands ppm to tens of thousands ppm), modifications to destination sulphuric acid plant 30 parameters (such as the furnaces) may be required to substantially achieve CO abatement.

Oxygen. The oxygen content of tail gas $G_1$ may be used to determine the quantity of tail gas $G_1$ that may be used to replace feedstock $D_1$ used by destination sulphuric acid plant 30. The oxygen content of tail gas $G_1$ is between about 0% to about 100%. Preferably, the oxygen content of tail gas $G_1$ is greater than about 21% to avoid upsetting destination sulphuric acid plant 30. Since tail gas G1 often contains less than about 21% oxygen content, the oxygen content of tail gas $G_1$ may be supplemented with oxygen-containing gas $H_1$ from an external source (such as an oxygen tank and/or an oxygen plant) to maximize the allowable use of tail gas $G_1$ and/or improve the performance of destination sulphuric acid plant 30 and/or increase the conversion of $SO_2$, reduce emissions and/or enhance $H_2SO_4$ production and/or allow for capacity increase as described elsewhere herein. Oxygen enrichment may improve overall plant hydraulics by reducing the total volumetric flow and/or improve the performance of catalytic converter 32 by improving oxidation reaction kinetics and/or equilibrium conditions. Enriching tail gas $G_1$ with oxygen-enriched gas $H_1$ may be beneficial to sites (i.e. industrial complexes) having large $H_2SO_4$ production rates and/or for systems where tail gas $G_1$ has poor oxygen content. Since tail gas $G_1$ is temporarily supplemented with oxygen-containing gas $H_1$ for relatively short durations of time, plant economies may be improved. In some embodiments a control system (such as control system 42 shown in FIG. 2) is used to adjust the flowrate of one or more of feedstock $D_1$, tail gas $G_1$, and oxygen-containing gas $H_1$ as described elsewhere herein.

Water. If the source of tail gas $G_1$ is a sulphuric acid plant, tail gas $G_1$ will be substantially free of water. However, tail gas $G_1$ produced by other sources may have significant water content. The water may be processed by feeding tail gas $G_1$ into destination sulphuric acid plant 30 upstream of a dry tower. The point of entry of tail gas $G_1$ into destination sulphuric acid plant 30 may depend on the plant water balance.

Other pollutants. The effect of other pollutants in tail gas $G_1$ on destination sulphuric acid plant 30 depends on the total loading of the tail gas. For example, other pollutants in tail gas $G_1$ may effect material compatibility and/or have fouling considerations. Persons skilled in the art will recognize that the effect of other pollutants should be studied on a case-by-case basis. For example:

Particulate matter (PM). Metallurgical and acid regeneration plants typically have gas cleaning equipment available to remove large concentrations of PM in tail gas $G_1$. However, sulphur-burning acid plants typically are not capable of handling large amounts of PM. If tail gas $G_1$ contains significant amounts of PM, tail gas $G_1$ should be transferred upstream of any available gas cleaning equipment.

Ozone. $O_3$ may be transferred to destination sulphuric acid plant 30 where it acts as an oxidizing agent.

Other pollutants. Other pollutants including one or more of S, COS, $CS_2$, $H_2S$, $NH_3$, and $H_2$ may be oxidized in a thermal stage of destination sulphuric acid plant 30 and/or oxidized by catalytic converter 32.

Inerts. Tail gas $G_1$ may contain inerts including one or more of $N_2$, Ar, and $CO_2$. Tail gas $G_1$ transferred to destination sulphuric acid plant 30 may replace feedstock $D_1$ and these inerts may serve as a carrier gas for destination sulphuric acid plant 30. Depending on one or more of the design of destination sulphuric acid plant 30, the plant production rate, the duration of the gas transfer, the level of $O_2$ enrichment, and the total oxygen of tail gas $G_1$, additional $N_2$ load may increase the total load of inerts of sulphuric acid plant 30.

The point of entry of oxygen-containing gas $H_1$ into system 1 depends on one or more of total gas flows, the composition of the gases involved, and the equipment available in destination sulphuric acid plant 30 as described elsewhere herein. In some embodiments oxygen-containing gas $H_1$ is added to system 1 at a point of entry that is different from the point of entry of tail gas $G_1$ described elsewhere herein. In some other embodiments oxygen-containing gas $H_1$ is added to system 1 at a point of entry that is the same as the point of entry of tail gas $G_1$. Oxygen-containing gas $H_1$ may be added to system 1 at one or more of the following example points of entry:

Upstream of gas handling processes 21. This point of entry may assist source of tail gas 20 to reach steady state conditions in less time (for example, by assisting to increase the temperature of any catalytic conversion beds). Some or all of the oxygen added upstream of gas handling processes 21 would be available to destination sulphuric acid plant 30 to maximize the allowable use of tail gas $G_1$ and/or improve the performance of sulphuric acid plant 30 and/or increase the conversion of $SO_2$, reduce emissions and/or allow for capacity increase as described elsewhere herein. In some embodiments feedstock $A_1$ may be supplemented with oxygen-containing gas. By supplementing feedstock $A_1$, oxygen is made available to all of the catalytic conversion beds of source of tail gas 20 and destination sulphuric acid plant 30. This may increase the outlet temperature of each catalytic conversion bed and shorten the heat-up time of source of tail gas 20.

Upstream of gas blower 38. This point of entry may provide suction and eliminate or lessen the need for additional equipment to transfer oxygen-containing gas $H_1$ to destination sulphuric acid plant 30.

Upstream of first stage of catalytic converter 32. Oxygen-containing gas $H_1$ that enters system 1 at this point of entry will be available to all stages of catalytic converter 32. In some embodiments it is desirable to feed oxygen-enriched gas upstream of all catalyst beds to realize the advantages associated with increasing the oxygen content in the catalyst beds.

Upstream of a final stage of catalytic converter 32 (for example, upstream of stage four or five). In some embodiments this point of entry may minimize equipment pressure drop.

Persons skilled in the art will recognize that source of tail gas 20 may be any process plant or component thereof producing tail gas. In some embodiments tail gas $G_1$ is exhaust gas and source of tail gas 20 is a combustion system. Source of tail gas 20 may be operating under steady state or start-up conditions (or other high emissions conditions). In some embodiments source of tail gas 20 uses high-sulphur content fuels.

Systems 1 and 10 may be used to reduce or eliminate emissions from a combustion source such as a diesel generator set containing about 500 to about 10,000 ppmv $SO_2$, about 9% to about 15% $O_2$, about 4% to about 12% $H_2O$, about 500 to about 2,000 ppmv $NO_x$, trace amounts of HC and CO, and balance $CO_2$ and $N_2$. Tail gas produced by such sources may be used to replace some or all of the feedstock used by the destination sulphuric acid plant as described elsewhere herein.

Systems 1 and 10 may be used to treat tail gas $G_1$ in an amount that is up to and includes the total amount of feedstock that can be used by destination sulphuric acid plant 30. In some embodiments the total amount of feedstock air that can be used by destination sulphuric acid plant 30 is about 100,000 $Nm^3/h$. Accordingly, systems 1 and 10 may be used to treat up to and including about 100,000 $Nm^3/h$ of tail gas $G_1$ provided the oxygen content of tail gas $G_1$ is sufficient and/or tail gas $G_1$ has been enriched with an oxygen-containing gas as described elsewhere herein.

Systems 1 and 10 may be used to reduce or eliminate sulphur-containing species present in tail gas $G_1$ at concentrations greater than about 1 ppmv. In some embodiments systems 1 and 10 are used to reduce or eliminate sulphur-containing species present in tail gas $G_1$ at concentrations greater than about 100 ppmv. In some embodiment, systems 1 and 10 may be used to reduce or eliminate sulphur-containing species present in tail gas $G_1$ at concentrations greater than about 1,000 ppmv.

Systems 1 and 10 may be used to reduce or eliminate other pollutants present in tail gas $G_1$ (including, but not limited to, one or more of $NO_x$, HC, CO, and $H_2$) at concentrations up to about 10,000 ppmv. At higher concentrations, modifications to destination sulphuric acid plant 30 may be required to sustain performance.

Systems 1 and 10 may be linked to a metallurgical process plant (not shown) that uses oxygen enrichment in smelting processes. Excess oxygen that is typically available in the metallurgical process plant may be used by source of tail gas 20 and/or destination sulphuric acid plant 30 to ensure normal operation of destination sulphuric acid plant 30. In this way, destination sulphuric acid plant 30 receives a sufficient amount of oxygen to allow for maximum production rates with low $SO_2$ emissions.

A system 50 for reducing emissions of one or more of $SO_2$, $SO_3$, $H_2SO_4$, $NO_x$, HC, CO, and other pollutants from tail gas produced by a source of tail gas 60 according to an example embodiment of the present invention is shown in FIG. 3. System 50 includes a destination sulphuric acid plant 70 and a gas transfer system 80. Source of tail gas 60 comprises a sulphuric acid plant that is unable to meet its emission requirements during start-up and/or during steady state conditions and/or due to a process upset. Persons skilled in the art will recognize that the location of the unit operations may change depending on the configuration of the acid plant. For example, a sulphur-burning acid plant would require a thermal stage, while a metallurgical acid plant would not.

During start-up conditions, the catalytic converter of a sulphuric acid plant transitions from colder start-up temperatures towards higher steady state operating temperatures and conditions. At the colder start-up temperatures, $SO_2$ may pass through the catalytic converter unreacted. Accordingly, $SO_2$ emissions may spike by one or two orders of magnitude. Spiked emissions may persist for several hours or days until steady state operating temperatures and conditions are established within the catalytic converter. It is not atypical to see a sulphuric acid plant with steady state $SO_2$ emissions on the order of about 300 ppm spike to over 5,000 ppm or higher during start-up. Start-up emissions of up to about 20,000 ppm in double absorption plants have been recorded. Start-up $SO_2$ emissions may be more severe for metallurgical plants that suffer from loss of ignition of their catalyst. Such plants may struggle to maintain adequate concentrations of $SO_2$ at an inlet end of the catalytic converter and/or to maintain temperatures of the catalytic converter. Also, during start-up conditions, the absorption/condensation stage of a sulphuric acid plant transitions from colder start-up temperatures towards higher steady state operating temperatures and conditions. At colder start-up temperatures $SO_3$ absorption is reduced.

System 50 may be used to reduce or eliminate start-up emissions of a source sulphuric acid plant. Typically, each sulphuric acid plant of a site (i.e. industrial complex) having two or more sulphuric acid plants is start-up at a different time due to one or more of safety, manpower, operation, and production commitment considerations. Thus, when a first sulphuric acid plant is in start-up conditions, a second sulphuric acid plant would typically be in steady state conditions. The second sulphuric acid plant (i.e. the "destination sulphuric acid plant") may be used to treat the tail gas produced by the first sulphuric acid plant (i.e. the "source sulphuric acid plant") to minimize the total emissions from the first sulphuric acid plant. Total emissions of system 50 are determined by the performance and operation of the destination sulphuric acid plant. For example, emissions of a state-of-the-art double absorption sulphuric acid plant may be as little as 100 parts per million (ppm) $SO_2$ with only trace amounts of $SO_3$ and $H_2SO_4$. Such emissions may comply with $SO_2$ emissions limits in North America (i.e. 2 kg of $SO_2$ and 0.075 kg of $H_2SO_4$ per metric ton of $H_2SO_4$ produced as 100% $H_2SO_4$). Thus, system 50 may be applied to sites having two or more sulphuric acid plants to reduce the emissions of a sulphuric acid plant unable to meet its emissions requirements during start-up. System 50 may be applied to sites having any type(s) of sulphuric acid plant (for example, one or more of metallurgical, regeneration, sulphur-burning, acid gas, and wet). System 50 may be used to achieve faster start-up times for the source sulphuric acid plant by allowing shorter preheating time. For example, operations of the source sulphuric acid plant may be started when only the first stage of the catalytic converter is at its target steady state temperature as described elsewhere herein. Faster start-up times may be achieved by increasing the concentration of $SO_2$ and/or $O_2$ fed to the source sulphuric acid plant.

System 50 may be used in steady state conditions where the source sulphuric acid plant is unable to meet its $SO_2$ emissions limits. For example, a source sulphuric acid plant operating under upset conditions and/or a single-absorption sulphuric acid plant unable to meet its $SO_2$ emissions limits. For such cases, the destination sulphuric acid plant may accept all or a fraction of the total tail gas from the source sulphuric acid plant. The destination sulphuric acid plant may provide double-absorption technology and/or some kind of tail gas scrubbing to achieve acceptable emissions limits.

Feedstock $A_2$ is fed to unit operations 31 of source of tail gas 60. Many features and components of source of tail gas 60 are similar to features and components of destination sulphuric acid plant 30, with the same reference numerals being used to indicate features and components that are similar between the embodiments. Feedstock $A_2$ typically comprises $SO_2$ in a concentration that is sufficient to warm-up the catalyst beds of catalytic converter 32 to a desired temperature. For example, the concentration of $SO_2$ in feedstock $A_2$ may be between about 6% to about 12%. In some embodiments the concentration of $SO_2$ in feedstock $A_2$ is about 8%. Persons skilled in the art will recognize a trade-off exists between start-up times and tail gas emissions. Start-up times may be reduced where feedstock $A_2$ comprises a higher $SO_2$ concentration. However, $SO_2$ emissions will then be high. $SO_2$ emissions may be reduced by decreasing the $SO_2$ concentration of feedstock $A_2$. However, start-up times will then be longer. Tail gas $B_2$ is produced by source of tail gas 60 and may be fed into gas stack 35 before being discharged as gas $C_2$ to the environment.

Feedstock $D_2$ is fed to gas handling processes 31 of destination sulphuric acid plant 70. Many features and components of destination sulphuric acid plant 70 are similar to features and components of destination sulphuric acid plant 30, with the same reference numerals being used to indicate features and components that are similar between the embodiments. Tail gas $E_2$ produced by destination sulphuric acid plant 70 may be fed into gas stack 35 before it is discharged as gas $F_2$ to the environment.

Tail gas $B_2$ produced by source of tail gas 60 may be transferred to destination sulphuric acid plant 70 via gas transfer system 80 as tail gas $G_2$. Destination sulphuric acid plant 70 may alternatively and/or additionally serve as the source of tail gas. In such embodiments source of tail gas 60 serves as the destination sulphuric acid plant and tail gas $E_2$ produced by destination sulphuric acid plant 70 is transferred to source of tail gas 60 via gas transfer system 80 as tail gas $H_2$. Tail gas $G_2$ may be used to replace or supplement feedstock $D_2$ and/or tail gas $H_2$ may be used to replace or supplement feedstock $A_2$ as described elsewhere herein. A common control system and process ancillaries may be used when either of plant 60 or 70 is operating as a source of tail gas or as a destination sulphuric acid plant. For sites that have more than two plants, the tail gas from the source plant may be fed into more than one destination sulphuric acid plant. The effects of tail gas on a destination sulphuric acid plant are described elsewhere herein.

In some embodiments oxygen-containing gas $I_2$ from an external source such as an oxygen tank and/or an oxygen plant is added to tail gas $G_2$ and/or tail gas $H_2$ to supplement the destination sulphuric acid plant with oxygen. Oxygen-containing gas $I_2$ may improve the performance of the destination sulphuric acid plant as described elsewhere herein. Where the source of tail gas is a metallurgical sulphuric acid plant with oxygen enrichment, the oxygen content of the tail gas could be much higher than that produced by a source of tail gas lacking oxygen enrichment, allowing for improved performance of the destination sulphuric acid plant. For example, the oxygen content of tail gas from some ore roasting operations may exceed 50% $O_2$.

Typically, tail gas $G_2$ and/or tail gas $H_2$ is fed to the destination sulphuric acid plant at a single point of entry (for example, at gas handling processes 31, at gas blower 38, at the first stages of catalytic converter 32, at the final stages of catalytic converter 32). In some other embodiments tail gas $G_2$ and/or tail gas $H_2$ is fed to the destination sulphuric acid plant at multiple points of entry. In some embodiments the points of entry of system 50 are virtually identical to those described elsewhere herein for system 1.

System 50 may be used to treat tail gas $G_2$ and/or tail gas $H_2$ in an amount that is up to and includes the total amount of feedstock that can be used by the destination sulphuric acid plant. In some embodiments the total amount of feedstock air that can be used by the destination sulphuric acid plant is about 100,000 $Nm^3/h$. Accordingly, system 50 may be used to treat up to and including about 100,000 $Nm^3/h$ of tail gas $G_2$ and/or tail gas $H_2$ provided tail gas $G_2$ and/or tail gas $H_2$ has been enriched with oxygen (or an oxygen-containing gas) as described elsewhere herein.

System 50 may be used to reduce or eliminate sulphur-containing species present in tail gas $G_2$ and/or tail gas $H_2$ at concentrations greater than about 1 ppmv. In some embodiments system 50 is used to reduce or eliminate sulphur-containing species present in tail gas $G_2$ and/or tail gas $H_2$ at concentrations greater than about 100 ppmv. In some embodiment, system 50 may be used to reduce or eliminate sulphur-containing species present in tail gas $G_2$ and/or tail gas $H_2$ concentrations greater than about 1,000 ppmv.

System 50 may be linked to a metallurgical process plant (not shown) that uses oxygen enrichment in smelting processes. Excess oxygen that is typically available in the metallurgical process plant may be used by source of tail gas 60 and/or destination sulphuric acid plant 70 to ensure normal operation of the destination sulphuric acid plant. In this way, the destination sulphuric acid plant receives a sufficient amount of oxygen to allow for maximum production rates with low $SO_2$ emissions.

Figure 4:
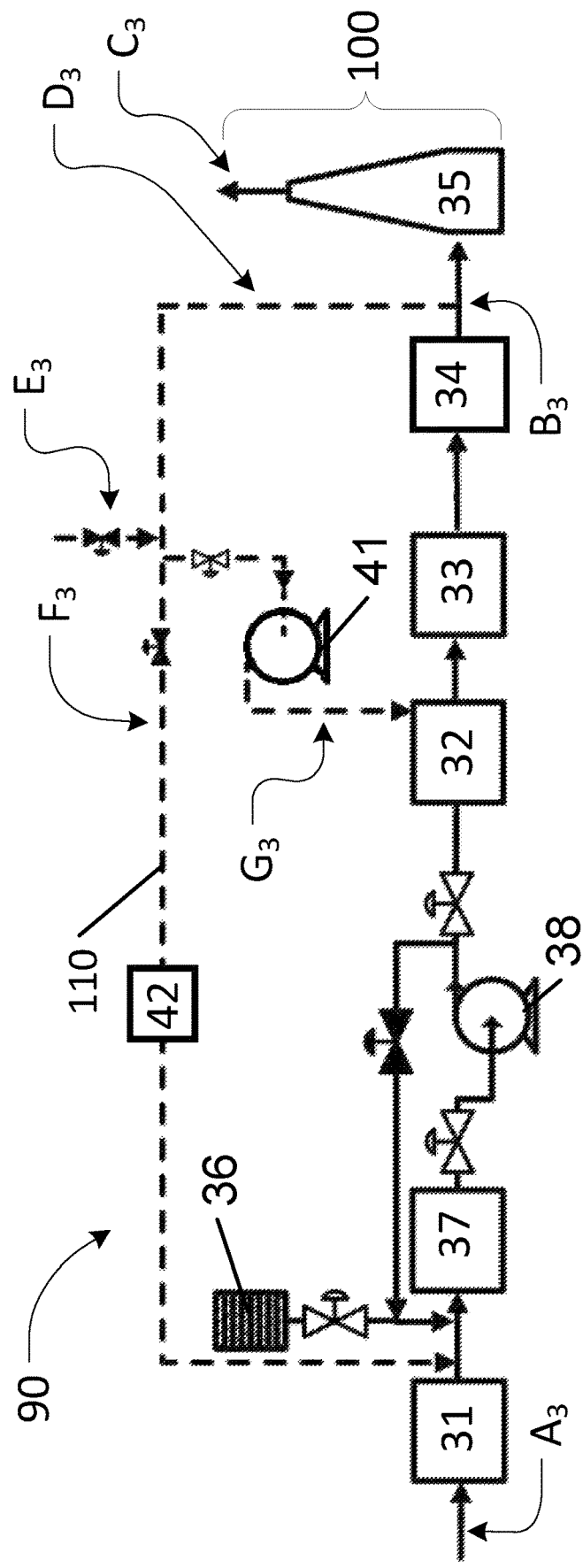
FIG. 4 is a schematic illustration of a gas treatment system according to an example embodiment of the present invention, wherein a gas transfer system recycles tail gas produced by a source of tail gas back to the source of tail gas.

A system 90 for reducing emissions of one or more of $SO_2$, $SO_3$, $H_2SO_4$, $NO_x$, HC, CO, and other pollutants from tail gas according to an example embodiment of the present invention is shown in FIG. 4. System 90 may be suitable for reducing the emissions of a sulphuric acid plant by recycling emissions using a gas transfer system 110. System 90 includes a source of tail gas 100 and gas transfer system 110 for recycling all or part of the tail gas produced by source of tail gas 100 back to source of tail gas 100. Accordingly, source of tail gas 100 acts as both the source of tail gas and as the destination sulphuric acid plant. System 90 may be applied to sites having any type of sulphuric acid plant (for example, one or more of metallurgical, regeneration, sulphur-burning, aid gas, and wet).

Feedstock $A_3$ is fed to gas handling processes 31 of source of tail gas 100. Many features and components of source of tail gas 100 are similar to features and components of destination sulphuric acid plant 30, with the same reference numerals being used to indicate features and components that are similar between the embodiments. Feedstock $A_3$ typically comprises $SO_2$ in a concentration that is sufficient to warm-up the catalyst beds of catalytic converter 32 to a desired temperature. For example, the concentration of $SO_2$ in feedstock $A_3$ may be between about 6% to about 12%. In some embodiments the concentration of $SO_2$ in feedstock $A_3$ is about 8%. Persons skilled in the art will recognize a trade-off exists between start-up times and tail gas emissions. Start-up times may be reduced where feedstock $A_3$ comprises a higher $SO_2$ concentration. However, $SO_2$ emissions will then be high. $SO_2$ emissions may be reduced by decreasing the $SO_2$ concentration of feedstock $A_3$. However, start-up times will then be longer. Tail gas $B_3$ produced by source of tail gas 100 may be fed into gas stack 35 before being discharged as gas $C_3$ to the environment. Tail gas $B_3$ may additionally or alternatively be recycled back to source of tail gas 100 as tail gas $D_3$ via gas transfer system 110. Tail gas $B_3$ is discharged from system 100 as either tail gas $C_3$ or $D_3$ depending on, for example, flow control. Pollutants may be separated from tail gas $C_3$ and discharged in tail gas $D_3$ using means conventionally known.

Recycled tail gas $D_3$ may be fed upstream gas blower 38 via gas transfer system 110 as tail gas $F_3$. Such a system may be used under start-up conditions to reduce start-up emissions and and/or under upset conditions. Recycled tail gas $D_3$ may additionally or alternatively be fed to catalytic converter 32 via gas transfer system 110 as tail gas $G_3$. It is generally advantageous to feed tail gas $D_3$ upstream of blower 38 to eliminate the need for a second blower (i.e. blower 41). However, due to plant hydraulics and other equipment limitations, blower 41 may be necessary. In some embodiments the points of entry of system 90 are virtually identical to those described elsewhere herein for system 1. Feedstock $A_3$ may be replaced or supplemented with tail gas $F_3$ and/or tail gas $G_3$ as described elsewhere herein.

During start-up of source of tail gas 100, emissions of sulphur-containing species (such as $SO_2$) may be much higher than under steady state conditions as described elsewhere herein. Part or all of tail gas $B_3$ produced by source of tail gas 100 may be recycled. Any remaining tail gas $B_3$ may be purged to the environment as gas $C_3$ via gas stack 35. Accordingly, abatement of sulphur-containing compounds from tail gas $B_3$ may be partially or substantially achieved during start-up. System 90 may be useful for achieving faster start-up times for source of tail gas 100 by allowing shorter preheating time and/or by saving sulphuric acid consumption from storage during plant preheat and start-up as described elsewhere herein. System 90 may also be used in steady state conditions where source of tail gas 100 is unable to meet its total $SO_2$ emissions limits in terms of total kg emitted per unit time (i.e. during upset conditions). System 90 may be used to further reduce $SO_2$ emissions where source of tail gas 100 is able to meet its total/legal $SO_2$ emissions limits; however, oxygen enrichment may render system 90 cost prohibitive in such circumstances.

In some embodiments oxygen-containing gas $E_3$ is added to tail gas $F_3$ and/or tail gas $G_3$ to supplement source of tail gas 100 with oxygen and improve the performance of the destination sulphuric acid plant as described elsewhere herein.

System 90 may be linked to a metallurgical process plant (not shown) that uses oxygen enrichment in smelting processes. Excess oxygen that is typically available in the metallurgical process plant may be used by source of tail gas/destination sulphuric acid plant 100 to ensure normal operation thereof. In this way, source of tail gas/destination sulphuric acid plant 100 receives a sufficient amount of oxygen to allow for maximum production rates with low $SO_2$ emissions.

While a number of exemplary aspects and embodiments are discussed herein, those of skill in the art will recognize certain modifications, permutations, additions and sub-combinations thereof. For example:

- tail gas may be transferred from more than one source of tail gas to a single destination sulphuric acid plant;
- where tail gas is transferred from more than one source of tail gas, the sources of tail gas may share a single gas transfer system;
- tail gas may be transferred from one or more sources of tail gas to more than one destination sulphuric acid plants;
- where tail gas is transferred to more than one destination sulphuric acid plant, the destination sulphuric acid plants may share a single gas transfer system;
- more than one gas transfer system may be used to transfer tail gas from at least one source of tail gas to at least one destination sulphuric acid plant.

Persons skilled in the art will recognize that the different embodiments of the present invention may share fundamental scientific and/or engineering principles in common. The description of common aspects, if appearing under one embodiment, may not necessarily be repeated in the description of successive embodiments.

The processes and systems described herein may include a control unit to perform various system- and component-level control functions as described elsewhere herein. The control unit, together with all instrumentation and signal lines, are not shown for simplicity.

The following are non-limiting enumerated example embodiments:

1. A gas treatment process for reducing emissions of one or more of $SO_2$, $SO_3$, $H_2SO_4$, $NO_x$, HC, CO, and other pollutants from a tail gas, the process comprising: transferring the tail gas from at least one source of tail gas to at least one destination sulphuric acid plant via at least one gas transfer system.
2. A gas treatment process according to claim 1, further comprising supplementing or replacing some or all of a feedstock used by the at least one destination sulphuric acid plant with the tail gas from the at least one source of tail gas.
3. A gas treatment process according to claim 2, wherein the amount of the feedstock replaced depends on the concentration of one or more of $O_2$, $SO_2$, $SO_3$, $H_2SO_4$, NOx, HC, CO and other pollutants in the tail gas.
4. A gas treatment process according to any one of claims 1 to 3, further comprising adjusting a flowrate of the feedstock to the at least one destination sulphuric acid plant.
5. A gas treatment process according to claim 4, wherein the flowrate of the feedstock is adjusted based on the concentration of one or more of $O_2$, $SO_2$, $SO_3$, $H_2SO_4$, $NO_x$, HC, CO, and other pollutants in the tail gas.
6. A gas treatment process according to any one of claims 1 to 5, further comprising adjusting a flowrate of the tail gas from the at least one source of tail gas to the at least one destination sulphuric acid plant.
7. A gas treatment process according to claim 6, wherein the flowrate of the tail gas is adjusted based on the concentration of one or more of $O_2$, $SO_2$, $SO_3$, $H_2SO_4$, NOx, HC, CO, and other pollutants in the tail gas.
8. A gas treatment process according to any one of claims 1 to 7, further comprising enriching the tail gas with an oxygen-containing gas.
9. A gas treatment process according to claim 8, wherein the tail gas is enriched with the oxygen-containing gas when the oxygen content of the tail gas is less than about 21%.
10. A gas treatment process according to claim 8 or 9, wherein enriching the tail gas comprises adding the oxygen-containing gas to the at least one source of tail gas.
11. A gas treatment process according to any one of claims 8 to 10, wherein enriching the tail gas comprises adding the oxygen-containing gas to a feedstock used by the at least one source of tail gas.
12. A gas treatment process according to any one of claims 8 to 11, wherein enriching the tail gas comprises adding the oxygen-containing gas upstream of gas handling processes of the at least one source of tail gas.
13. A gas treatment process according to any one of claims 8 to 12, wherein enriching the tail gas comprises adding the oxygen-containing gas to the at least one gas transfer system.
14. A gas treatment process according to any one of claims 8 to 13, wherein enriching the tail gas comprises adding the oxygen-containing gas to the at least one destination sulphuric acid plant.

15. A gas treatment process according to any one of claims 8 to 14, wherein enriching the tail gas comprises adding the oxygen-containing gas upstream of a gas blower of the at least one destination sulphuric acid plant.

16. A gas treatment process according to any one of claims 8 to 15, wherein enriching the tail gas comprises adding the oxygen-containing gas upstream of a catalytic converter of the at least one destination sulphuric acid plant.

17. A gas treatment process according to claim 16, wherein the oxygen-containing gas is added upstream of a first stage of the catalytic converter.

18. A gas treatment process according to claim 16 or 17, wherein the oxygen-containing gas is added upstream of a final stage of the catalytic converter.

19. A gas treatment process according to any one of claims 8 to 18, wherein enriching the tail gas comprises adding the oxygen-containing gas at one or more of the following points of entry: upstream of gas handling processes of the at least one destination sulphuric acid plant and upstream of a thermal stage of the at least one destination sulphuric acid plant.

20. A gas treatment process according to any one of claims 1 to 19, further comprising preventing transfer of the tail gas from the at least one source of tail gas to the at least one destination sulphuric acid plant if the at least one source of tail gas malfunctions or otherwise ceases operating normally.

21. A gas treatment process according to any one of claims 1 to 20, further comprising transferring the tail gas from the at least one source of tail gas to the at least one destination sulphuric acid plant upstream of the catalytic converter of the at least one destination sulphuric acid plant.

22. A gas treatment process according to claim 21, wherein the tail gas is transferred upstream of the first stage of the catalytic converter.

23. A gas treatment process according to claim 21 or 22, wherein the tail gas is transferred upstream of the final stage of the catalytic converter.

24. A gas treatment process according to any one of claims 1 to 23, further comprising transferring the tail gas from the at least one source of tail gas to the at least one destination sulphuric acid plant upstream of an absorption/condensation stage of the at least one destination sulphuric acid plant.

25. A gas treatment process according to any one of claims 1 to 24, further comprising transferring the tail gas from the at least one source of tail gas to the at least one destination sulphuric acid plant upstream of the gas handling processes of the at least one destination sulphuric acid plant.

26. A gas treatment process according to any one of claims 1 to 25, further comprising transferring the tail gas from the at least one source of tail gas to the at least one destination sulphuric acid plant upstream of the gas blower of the at least one destination sulphuric acid plant.

27. A gas treatment process according to any one of claims 1 to 26, further comprising transferring the tail gas from the at least one source of tail gas to the at least one destination sulphuric acid plant to one or more of the following points of entry: upstream of a dry tower of the at least one destination sulphuric acid plant and upstream of a thermal stage of the at least one destination sulphuric acid plant.

28. A gas treatment process according to any one of claims 1 to 27, further comprising compressing the tail gas from the at least one source of tail gas.

29. A gas treatment process according to any one of claims 1 to 28, wherein the at least one source of tail gas is in start-up conditions.

30. A gas treatment process according to any one of claims 1 to 28, wherein the at least one source of tail gas is in upset conditions.

31. A gas treatment process according to any one of claims 1 to 28, wherein the at least one source of tail gas is in steady state conditions.

32. A gas treatment process according to any one of claims 1 to 31, wherein the tail gas comprises a combined sulphur-containing species concentration of at least 1 ppmv.

33. A gas treatment process according to any one of claims 1 to 31, wherein the tail gas comprises a combined sulphur-containing species concentration of at least 100 ppmv.

34. A gas treatment process according to any one of claims 1 to 31, wherein the tail gas comprises a combined sulphur-containing species concentration of at least 1,000 ppmv.

35. A gas treatment process according to any one of claims 1 to 34, wherein the at least one source of tail gas is the at least one destination sulphuric acid plant.

36. A gas treatment process according to any one of claims 1 to 35, wherein the at least one source of tail gas comprises a sulphuric acid plant.

37. A gas treatment process according to claim 36, wherein the at least one source of tail gas comprises a single-absorption sulphuric acid plant.

38. A gas treatment process according to claim 37, wherein the at least one destination sulphuric acid plant comprises a double-absorption sulphuric acid plant.

39. A gas treatment process according to claim 37 or 38, wherein the at least one destination sulphuric acid plant comprises a tail gas scrubber.

40. A gas treatment process according to any one of claims 1 to 34, wherein the at least one source of tail gas is generated by a combustion process.

41. A gas treatment process according to claim 40, wherein the combustion process comprises operating an internal combustion engine.

42. A gas treatment process according to any one of claims 1 to 34, wherein the at least one source of tail gas comprises a sulphur recovery plant.

43. A gas treatment system for reducing emissions of one or more of $SO_2$, $SO_3$, $H_2SO_4$, $NO_x$, HC, CO, and other pollutants from a tail gas, the system comprising:
at least one destination sulphuric acid plant; and
at least one tail gas transfer system for transferring the tail gas to the at least one destination sulphuric acid plant.

44. A gas treatment system according to claim 43, wherein each of the at least one destination sulphuric acid plant comprises a feedstock control system for adjusting the flowrate of a feedstock to the destination sulphuric acid plant.

45. A gas treatment system according to claim 44, wherein the feedstock control system adjusts the flowrate of the feedstock to the corresponding destination sulphuric acid plant based on the concentration of one or more of $O_2$, $SO_2$, $SO_3$, $H_2SO_4$, $NO_x$, HC, CO, and other pollutants in the tail gas.

46. A gas treatment system according to any one of claims 43 to 45, wherein the at least one tail gas transfer system comprises a tail gas control system for adjusting the flowrate of the tail gas to the at least one destination sulphuric acid plant.
47. A gas treatment system according to claim 46, wherein the tail gas control system adjusts the flowrate of the tail gas to the at least one destination sulphuric acid plant based on the concentration of one or more of $O_2$, $SO_2$, $SO_3$, $H_2SO_4$, $NO_x$, HC, CO, and other pollutants in the tail gas.
48. A gas treatment system according to claim 43, further comprising a control system for adjusting the flowrate of a feedstock to the at least one destination sulphuric acid plant and for adjusting the flowrate of the tail gas to the at least one destination sulphuric acid plant.
49. A gas treatment system according to claim 48, wherein the control system adjusts the flowrate of the tail gas to the at least one destination sulphuric acid plant based on the concentration of one or more of $O_2$, $SO_2$, $SO_3$, $H_2SO_4$, $NO_x$, HC, CO, and other pollutants in the tail gas.
50. A gas treatment system according to claim 48 or 49, wherein the control system adjusts the flowrate of the feedstock to the at least one destination sulphuric acid plant based on the concentration of one or more of $O_2$, $SO_2$, $SO_3$, $H_2SO_4$, $NO_x$, HC, CO, and other pollutants in the tail gas
51. A gas treatment system according to any one of claims 43 to 50, wherein the at least one tail gas transfer system transfers the tail gas to the at least one destination sulphuric acid plant upstream of a catalytic converter.
52. A gas treatment system according to claim 51, wherein the catalytic converter comprises at least one stage of catalytic conversion.
53. A gas treatment system according to claim 51, wherein the catalytic converter comprises at least one stage of a $V_2O_5$-based catalytic conversion.
54. A gas treatment system according to claim 51, wherein the catalytic converter comprises at least one stage of a Cs-based $V_2O_5$-based catalytic conversion.
55. A gas treatment system according to claims 52 to 54 wherein the tail gas is transferred upstream of a first stage of the catalytic converter.
56. A gas treatment system according to claims 52 to 55, wherein the tail gas is transferred upstream of a final stage of the catalytic converter.
57. A gas treatment system according to any one of claims 43 to 56, wherein the at least one tail gas transfer system transfers the tail gas to the at least one destination sulphuric acid plant upstream of at least one absorption/condensation stage.
58. A gas treatment system according to claim 57, wherein the at least one absorption/condensation stage comprises a gas-liquid contactor.
59. A gas treatment system according to claim 58, wherein the gas-liquid contactor comprises a packed tower.
60. A gas treatment system according to claim 57, wherein the at least one absorption/condensation stage comprises an indirect contact condenser.
61. A gas treatment system according to claim 60, wherein the indirect contact condenser comprises a shell and tube condenser.
62. A gas treatment system according to any one of claims 43 to 61, wherein the at least one tail gas transfer system transfers the tail gas to the at least one destination sulphuric acid plant upstream of gas handling processes.
63. A gas treatment system according to any one of claims 43 to 62, wherein the at least one tail gas transfer system transfers the tail gas to the at least one destination sulphuric acid plant upstream of a gas blower.
64. A gas treatment system according to any one of claims 43 to 63, wherein the at least one tail gas transfer system transfers the tail gas to the at least one destination sulphuric acid plant upstream of a dry tower.
65. A gas treatment system according to any one of claims 43 to 64 wherein the tail gas comprises a combined sulphur-containing species concentration of at least 1 ppmv.
66. A gas treatment system according to any one of claims 43 to 64, wherein the tail gas comprises a combined sulphur-containing species concentration of at least 100 ppmv.
67. A gas treatment system according to any one of claims 43 to 64, wherein the tail gas comprises a combined sulphur-containing species concentration of at least 1,000 ppmv.
68. A gas treatment system according to any one of claims 43 to 67, wherein the at least one tail gas transfer system transfers the tail gas from at least one source of tail gas.
69. A gas treatment system according to claim 68, wherein the at least one source of tail gas is operating under start-up conditions.
70. A gas treatment system according to claim 68, wherein the at least one source of tail gas is operating under upset conditions.
71. A gas treatment system according to claim 68, wherein the at least one source of tail gas is operating under steady state conditions.
72. A gas treatment system according to any one of claims 68 to 71, wherein the at least one source of tail gas is the at least one destination sulphuric acid plant.
73. A gas treatment system according to any one of claims 68 to 72, wherein the at least one source of tail gas comprises a sulphuric acid plant.
74. A gas treatment system according to claim 73, wherein the at least one source of tail gas comprises a single-absorption sulphuric acid plant.
75. A gas treatment system according to claim 74, wherein the at least one destination sulphuric acid plant comprises a double-absorption sulphuric acid plant.
76. A gas treatment system according to any one of claims 68 to 71, wherein the at least one source of tail gas comprises a combustion device.
77. A gas treatment system according to claim 76, wherein the combustion device comprises an internal combustion engine.
78. A gas treatment system according to any one of claims 68 to 71, wherein the at least one source of tail gas comprises a sulphur recovery plant.
79. A gas treatment system according to any one of claims 43 to 78, wherein the at least one destination sulphuric acid plant comprises a tail gas scrubber.
80. A gas treatment system according to any one of claims 43 to 79, wherein the tail gas is supplemented with an oxygen-containing gas.
81. A gas treatment system according to claim 80, wherein the tail gas is enriched with the oxygen-containing gas when the oxygen content of the tail gas is less than about 21%.

82. A gas treatment system according to claim 80 or 81, wherein the at least one tail gas transfer system is supplemented with the oxygen-containing gas.
83. A gas treatment system according to any one of claims 80 to 82, wherein the at least one destination sulphuric acid plant is supplemented with the oxygen-containing gas.
84. A gas treatment system according to claim 83, wherein the at least one destination sulphuric acid plant is supplemented with the oxygen-containing gas upstream of the gas blower of the at least one destination sulphuric acid plant.
85. A gas treatment system according to claim 83 or 84, wherein the at least one destination sulphuric acid plant is supplemented with the oxygen-containing gas upstream of the catalytic converter of the destination sulphuric acid plant.
86. A gas treatment system according to claim 85, wherein the at least one destination sulphuric acid plant is supplemented with the oxygen-containing gas upstream of the first stage of the catalytic converter.
87. A gas treatment system according to claim 85 or 86, wherein the at least one destination sulphuric acid plant is supplemented with the oxygen-containing gas upstream of the final stage of the catalytic converter.
88. A gas treatment system according to any one of claims 80 to 87, wherein the at least one destination sulphuric acid plant is supplemented with the oxygen-containing gas upstream of the gas handling processes of the at least one destination sulphuric acid plant.
89. A gas treatment system according to any one of claims 80 to 88, wherein the at least one source of tail gas is supplemented with the oxygen-containing gas.
90. A gas treatment system according to claim 89, wherein a feedstock used by the at least one source of tail gas is supplemented with the oxygen-containing gas.
91. A gas treatment system according to claim 89 or 90, wherein the at least one source of tail gas is supplemented with the oxygen-containing gas upstream of gas handling processes.
92. A gas treatment system according to any one of claims 43 to 91, wherein the at least one tail gas transfer system comprises a booster fan or a pressure increasing device.
93. A gas treatment process for reducing emissions of one or more of $SO_2$, $SO_3$, $H_2SO_4$, $NO_x$, HC, CO, and other pollutants from a tail gas, the process comprising: transferring the tail gas from a source sulphuric acid plant in start-up or upset conditions to a destination sulphuric acid plant in steady state conditions via a gas transfer system.
94. A gas treatment process according to claim 93 further comprising adjusting a feedstock flowrate to the destination sulphuric acid plant in response to the concentration of one or more of $SO_2$, $SO_3$, $H_2SO_4$, $NO_x$, HC, CO, and other pollutants in the tail gas.
95. A gas treatment process according to claim 94 wherein the feedstock flowrate is reduced if the concentration of one or more of $SO_2$, $SO_3$, $H_2SO_4$, $NO_x$, HC, CO, and other pollutants in the tail gas exceeds a predetermined threshold.
96. A gas treatment process according to claim 94 wherein the feedstock flowrate is increased if the concentration of one or more of $SO_2$, $SO_3$, $H_2SO_4$, $NO_x$, HC, CO, and other pollutants in the tail gas is below a predetermined threshold.
97. A gas treatment process according to claim 93 further comprising adjusting a tail gas flowrate to the destination sulphuric acid plant in response to the concentration of one or more of $SO_2$, $SO_3$, $H_2SO_4$, $NO_x$, HC, CO, and other pollutants in the tail gas.
98. A gas treatment process according to claim 97 wherein the tail gas flowrate is reduced if the concentration of one or more of $SO_2$, $SO_3$, $H_2SO_4$, $NO_x$, HC, CO, and other pollutants in the tail gas exceeds a predetermined threshold.
99. A gas treatment process according to claim 97 wherein the tail gas flowrate is increased if the concentration of one or more of $SO_2$, $SO_3$, $H_2SO_4$, $NO_x$, HC, CO, and other pollutants in the tail gas is below a predetermined threshold.
100. A gas treatment process according to claim 93 further comprising adjusting a tail gas flowrate to the destination sulphuric acid plant in response to the operating conditions of the destination sulphuric acid plant.
101. A gas treatment process according to claim 100 wherein the tail gas flowrate is reduced if the destination sulphuric acid is in start-up or upset conditions.
102. A gas treatment process according to claim 100 wherein the tail gas flowrate is reduced if the temperature of a thermal stage of the destination sulphuric acid plant is less than about 900° C.
103. A gas treatment process according to claim 100 wherein the tail gas flowrate is reduced if the concentration of sulphur dioxide ($SO_2$) at an inlet of a first catalyst bed of a catalytic converter of the destination sulphuric acid plant is greater than about 12% mol/mol.
104. A gas treatment process according to claim 100 wherein the tail gas flowrate is reduced if the concentration of $SO_2$ at a gas stack of the destination sulphuric acid plant is greater than about 500 ppm.
105. A gas treatment process according to claim 100 wherein the tail gas flowrate is reduced if the temperature of the catalytic converter of the destination sulphuric acid plant is less than about 380° C.
106. A gas treatment process according to claim 93 further comprising enriching one or more of a source sulphuric acid plant feedstock, a destination sulphuric acid plant feedstock, the tail gas, the source sulphuric acid plant, and the destination sulphuric acid plant with an oxygen-containing gas by adjusting an oxygen-containing gas flowrate.
107. A gas treatment process according to claim 106 wherein the oxygen-containing gas flowrate is increased if the concentration of oxygen ($O_2$) at the inlet of the destination sulphuric acid plant is less than about 21% mol/mol.
108. A gas treatment process according to claim 106 wherein the oxygen-containing gas flowrate is increased if the concentration of sulphur dioxide ($SO_2$) at the inlet of the first catalyst bed of the catalytic converter of the destination sulphuric acid plant is greater than about 12% mol/mol.
109. A gas treatment process according to claim 106 wherein the oxygen-containing gas flowrate is increased if the concentration of $SO_2$ at the stack of the destination sulphuric acid plant is greater than about 500 ppm.
110. A gas treatment process according to claim 106 wherein the oxygen-containing gas flowrate is increased if the temperature of the catalytic converter of the destination sulphuric acid plant is less than about 380° C.

111. A gas treatment process according to claim 93 wherein the tail gas comprises a combined sulphur-containing species concentration of at least 1 ppmv.

112. A gas treatment process according to claim 93 wherein the tail gas comprises a combined sulphur-containing species concentration of at least 100 ppmv.

113. A gas treatment process according to claim 93 wherein the tail gas comprises a combined sulphur-containing species concentration of at least 1,000 ppmv.

114. A gas treatment process according to claim 93 wherein the source sulphuric acid plant comprises the destination sulphuric acid plant and the gas transfer system transfers the tail gas from a downstream sulphuric acid plant location to an upstream sulphuric acid plant location.

115. A gas treatment system for reducing emissions of one or more of $SO_2$, $SO_3$, $H_2SO_4$, $NO_x$, HC, CO, and other pollutants from a tail gas, the system comprising:
 a source sulphuric acid plant in start-up or upset conditions;
 a destination sulphuric acid plant in steady state conditions; and
 a gas transfer system for transferring the tail gas from the source sulphuric acid plant to the destination sulphuric acid plant.

116. A gas treatment system according to claim 115 further comprising a control system for adjusting a feedstock flowrate to the destination sulphuric acid plant in response to the concentration of one or more of $SO_2$, $SO_3$, $H_2SO_4$, $NO_x$, HC, CO, and other pollutants in the tail gas.

117. A gas treatment system according to claim 115 further comprising a control system for adjusting a tail gas flowrate to the destination sulphuric acid plant in response to the concentration of one or more of $SO_2$, $SO_3$, $H_2SO_4$, $NO_x$, HC, CO, and other pollutants in the tail gas.

118. A gas treatment system according to claim 115 further comprising a control system for adjusting a tail gas flowrate to the destination sulphuric acid plant in response to the operating conditions of the destination sulphuric acid plant.

119. A gas treatment system according to claim 115 further comprising a control system for adjusting an oxygen-containing gas flowrate to one or more of the tail gas, the source sulphuric acid plant, the destination sulphuric acid plant, a source sulphuric acid plant feedstock, and a destination sulphuric acid plant feedstock.

120. A gas treatment system according to claim 115 wherein the tail gas comprises a combined sulphur-containing species concentration of at least 1 ppmv.

121. A gas treatment system according to claim 115 wherein the tail gas comprises a combined sulphur-containing species concentration of at least 100 ppmv.

122. A gas treatment system according to claim 115 wherein the tail gas comprises a combined sulphur-containing species concentration of at least 1,000 ppmv.

123. A gas treatment system according to claim 115 wherein the source sulphuric acid plant comprises the destination sulphuric acid plant and the gas transfer system transfers the tail gas from a downstream sulphuric acid plant location to an upstream sulphuric acid plant location.

124. Apparatus having any new and inventive feature, combination of features, or sub-combination of features as described herein.

125. Methods having any new and inventive steps, acts, combination of steps and/or acts or sub-combination of steps and/or acts as described herein.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the connection or coupling between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Where a component (e.g. a substrate, assembly, device, manifold, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments described herein.

Specific examples of systems, methods, and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A gas treatment process for reducing emissions of one or more of $SO_2$, $SO_3$, $H_2SO_4$, $NO_x$, HC, CO, and other pollutants from a tail gas, the process comprising:

transferring the tail gas from a source sulphuric acid plant operating in start-up or upset conditions to a destination sulphuric acid plant operating in steady state conditions via a gas transfer system;

monitoring a concentration of one or more of $SO_2$, $SO_3$, $H_2SO_4$, $NO_x$, HC, CO, and other pollutants in one or more of the tail gas and a process gas of the destination sulphuric acid plant and adjusting a flowrate of the tail gas to the destination sulphuric acid plant based on the concentration of one or more of $SO_2$, $SO_3$, $H_2SO_4$, $NO_x$, HC, CO, and other pollutants in the tail gas; and reducing the flowrate of the tail gas in response to determining that a concentration of $SO_2$ at an inlet of a first catalyst bed of a catalytic converter of the destination sulphuric acid plant is greater than about 12% mol/mol.

2. A gas treatment process according to claim 1 comprising reducing the flowrate of the tail gas in response to determining that a concentration of $SO_2$ at a gas stack of the destination sulphuric acid plant is greater than about 500 ppm.

3. A gas treatment process according to claim 1 further comprising monitoring an operating status of the destination sulphuric acid plant and adjusting a flowrate of the tail gas to the destination sulphuric acid plant based on the operating status of the destination sulphuric acid plant.

4. A gas treatment process according to claim 3 comprising reducing the flowrate of the tail gas in response to determining that the destination sulphuric acid plant has commenced operating in start-up or upset conditions.

5. A gas treatment process according to claim 3 comprising reducing the flowrate of the tail gas in response to determining that a temperature of a thermal stage of the destination sulphuric acid plant is less than about 900° C.

6. A gas treatment process according to claim 3 comprising reducing the flowrate of the tail gas in response to determining that a temperature of a catalytic converter of the destination sulphuric acid plant is less than about 380° C.

7. A gas treatment process according to claim 1 further comprising adjusting a flowrate of a feedstock to the destination sulphuric acid plant based on the monitored concentration of one or more of SO2, SO3, H2SO4, NOx, HC, CO, and other pollutants in the tail gas.

8. A gas treatment process according to claim 7 comprising reducing the flowrate of the feedstock if the monitored concentration of one or more of SO2, SO3, H2SO4, NOx, HC, CO, and other pollutants in the tail gas exceeds a predetermined threshold.

9. A gas treatment process according to claim 7 comprising increasing the flowrate of the feedstock if the monitored concentration of one or more of SO2, SO3, H2SO4, NOx, HC, CO, and other pollutants in the tail gas is below a predetermined threshold.

10. A gas treatment process according to claim 1 comprising reducing the flowrate of the tail gas if the monitored concentration of one or more of SO2, SO3, H2SO4, NOx, HC, CO, and other pollutants in the tail gas exceeds a predetermined threshold.

11. A gas treatment process according to claim 1 comprising increasing the flowrate of the tail gas if the monitored concentration of one or more of SO2, SO3, H2SO4, NOx, HC, CO, and other pollutants in the tail gas is below a predetermined threshold.

12. A gas treatment process for reducing emissions of one or more of $SO_2$, $SO_3$, $H_2SO_4$, $NO_x$, HC, CO, and other pollutants from a tail gas, the process comprising:

transferring the tail gas from a source sulphuric acid plant operating in start-up or upset conditions to a destination sulphuric acid plant operating in steady state conditions via a gas transfer system;

monitoring a concentration of $O_2$ in one or more of a feedstock to the source sulphuric acid plant, a feedstock to the destination sulphuric acid plant, the tail gas, a process gas of the source sulphuric acid plant, and a process gas of the destination sulphuric acid plant and enriching one or more of the feedstock to the source sulphuric acid plant, the feedstock to the destination sulphuric acid plant, the tail gas, the process gas of the source sulphuric acid plant, and the process gas of the destination sulphuric acid plant with an oxygen-containing gas based on the monitored concentration of $O_2$ by adjusting a flowrate of the oxygen-containing gas; and increasing the flowrate of the oxygen-containing gas in response to determining that the monitored concentration of $O_2$ at an inlet of the destination sulphuric acid plant is less than about 21% mol/mol.

13. A gas treatment process according to claim 12 comprising increasing the flowrate of the oxygen-containing gas in response to determining that the monitored concentration of $SO_2$ at a gas stack of the destination sulphuric acid plant is greater than about 500 ppm.

14. A gas treatment process according to claim 12 further comprising monitoring an operating status of the destination sulphuric acid plant and adjusting the flowrate of the oxygen-containing gas to one or more of a feedstock to the source sulphuric acid plant, the feedstock to the destination sulphuric acid plant, the tail gas, the process gas of the source sulphuric acid plant, and the process gas of the destination sulphuric acid plant based on the operating status of the destination sulphuric acid plant by adjusting a flowrate of the oxygen-containing gas.

15. A gas treatment process according to claim 14 comprising increasing the flowrate of the oxygen-containing gas in response to determining that a temperature of a thermal stage of the destination sulphuric acid plant is less than about 900° C.

16. A gas treatment process according to claim 14 comprising increasing the flowrate of the oxygen-containing gas in response to determining that a temperature of a catalytic converter of the destination sulphuric acid plant is less than about 380° C.

17. A gas treatment process according to claim 12 wherein the tail gas comprises a combined sulphur-containing species concentration of at least 100 ppmv.

18. A gas treatment process according to claim 12 wherein the tail gas comprises a combined sulphur-containing species concentration of at least 1,000 ppmv.

19. A gas treatment process according to claim 12 wherein the source sulphuric acid plant comprises the destination sulphuric acid plant and the gas transfer system transfers the tail gas from a location in the source sulphuric acid plant downstream from a catalytic converter of the source sulphuric acid plant to a location in the source sulphuric acid plant upstream from the catalytic converter of the source sulphuric acid plant.

20. A gas treatment process according to claim 12 further comprising monitoring a concentration of one or more of $SO_2$, $SO_3$, $H_2SO_4$, $NO_x$, HC, CO, and other pollutants in the tail gas and adjusting a flowrate of the feedstock to the destination sulphuric acid plant based on the monitored concentration of one or more of $SO_2$, $SO_3$, $H_2SO_4$, $NO_x$, HC, CO, and other pollutants in the tail gas.

21. A gas treatment process according to claim 20 comprising reducing the flowrate of the feedstock if the monitored concentration of one or more of $SO_2$, $SO_3$, $H_2SO_4$, $NO_x$, HC, CO, and other pollutants in the tail gas exceeds a predetermined threshold.

22. A gas treatment process according to claim 20 comprising increasing the flowrate of the feedstock if the monitored concentration of one or more of $SO_2$, $SO_3$, $H_2SO_4$, $NO_x$, HC, CO, and other pollutants in the tail gas is below a predetermined threshold.

23. A gas treatment process according to claim 12 comprising monitoring a concentration of one or more of $SO_2$, $SO_3$, $H_2SO_4$, $NO_x$, HC, CO, and other pollutants in the tail gas and reducing the flowrate of the tail gas if the monitored concentration of one or more of $SO_2$, $SO_3$, $H_2SO_4$, $NO_x$, HC, CO, and other pollutants in the tail gas exceeds a predetermined threshold.

24. A gas treatment process according to claim 12 comprising monitoring a concentration of one or more of $SO_2$, $SO_3$, $H_2SO_4$, $NO_x$, HC, CO, and other pollutants in the tail gas and increasing the flowrate of the tail gas if the monitored concentration of one or more of $SO_2$, $SO_3$, $H_2SO_4$, $NO_x$, HC, CO, and other pollutants in the tail gas is below a predetermined threshold.

25. A gas treatment process for reducing emissions of one or more of $SO_2$, $SO_3$, $H_2SO_4$, $NO_x$, HC, CO, and other pollutants from a tail gas, the process comprising:
    transferring the tail gas from a source sulphuric acid plant operating in start-up or upset conditions to a destination sulphuric acid plant operating in steady state conditions via a gas transfer system;
    monitoring a concentration of one or more of $SO_2$, $SO_3$, $H_2SO_4$, $NO_x$, HC, CO, and other pollutants in one or more of a feedstock to the source sulphuric acid plant, a feedstock to the destination sulphuric acid plant, the tail gas, a process gas of the source sulphuric acid plant, and a process gas of the destination sulphuric acid plant and enriching one or more of the feedstock to the source sulphuric acid plant, the feedstock to the destination sulphuric acid plant, the tail gas, the process gas of the source sulphuric acid plant, and the process gas of the destination sulphuric acid plant with an oxygen-containing gas based on the monitored concentration of one or more of $SO_2$, $SO_3$, $H_2SO_4$, $NO_x$, HC, CO, and other pollutants by adjusting a flowrate of the oxygen-containing gas; and
    increasing the flowrate of the oxygen-containing gas in response to determining that the monitored concentration of $SO_2$ at an inlet of a first catalyst bed of a catalytic converter of the destination sulphuric acid plant is greater than about 12% mol/mol.

26. A gas treatment process according to claim 25 further comprising monitoring an operating status of the destination sulphuric acid plant and adjusting the flowrate of the oxygen-containing gas to one or more of the feedstock to the source sulphuric acid plant, the feedstock to the destination sulphuric acid plant, the tail gas, the process gas of the source sulphuric acid plant, and the process gas of the destination sulphuric acid plant based on the operating status of the destination sulphuric acid plant by adjusting a flowrate of the oxygen-containing gas.

27. A gas treatment process according to claim 26 comprising increasing the flowrate of the oxygen-containing gas in response to determining that a temperature of a thermal stage of the destination sulphuric acid plant is less than about 900° C.

28. A gas treatment process according to claim 26 comprising increasing the flowrate of the oxygen-containing gas in response to determining that a temperature of a catalytic converter of the destination sulphuric acid plant is less than about 380° C.

29. A gas treatment process according to claim 25 wherein the tail gas comprises a combined sulphur-containing species concentration of at least 100 ppmv.

30. A gas treatment process according to claim 25 wherein the tail gas comprises a combined sulphur-containing species concentration of at least 1,000 ppmv.

31. A gas treatment process according to claim 25 wherein the source sulphuric acid plant comprises the destination sulphuric acid plant and the gas transfer system transfers the tail gas from a location in the source sulphuric acid plant downstream from a catalytic converter of the source sulphuric acid plant to a location in the source sulphuric acid plant upstream from the catalytic converter of the source sulphuric acid plant.

32. A gas treatment process according to claim 25 further comprising adjusting a flowrate of the feedstock to the destination sulphuric acid plant based on the monitored concentration of one or more of $SO_2$, $SO_3$, $H_2SO_4$, $NO_x$, HC, CO, and other pollutants in the tail gas wherein adjusting the flowrate of the feedstock comprises:
    reducing the flowrate of the feedstock if the monitored concentration of one or more of $SO_2$, $SO_3$, $H_2SO_4$, $NO_x$, HC, CO, and other pollutants in the tail gas exceeds a predetermined threshold; and
    increasing the flowrate of the feedstock if the monitored concentration of one or more of $SO_2$, $SO_3$, $H_2SO_4$, $NO_x$, HC, CO, and other pollutants in the tail gas is below a predetermined threshold.

33. A gas treatment process according to claim 25 comprising reducing the flowrate of the tail gas if the monitored concentration of one or more of $SO_2$, $SO_3$, $H_2SO_4$, $NO_x$, HC, CO, and other pollutants in the tail gas exceeds a predetermined threshold.

* * * * *